US011367291B2

(12) United States Patent
Hayashi et al.

(10) Patent No.: US 11,367,291 B2
(45) Date of Patent: Jun. 21, 2022

(54) TRAFFIC SIGNAL DISPLAY ESTIMATION SYSTEM

(71) Applicant: Toyota Jidosha Kabushiki Kaisha, Toyota (JP)

(72) Inventors: Yusuke Hayashi, Susono (JP); Taichi Kawanai, Susono (JP); Kentaro Ichikawa, Shizuoka-ken (JP); Taisuke Sugaiwa, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 16/931,760

(22) Filed: Jul. 17, 2020

(65) Prior Publication Data

US 2021/0027076 A1 Jan. 28, 2021

(30) Foreign Application Priority Data

Jul. 23, 2019 (JP) .............................. JP2019-135553

(51) Int. Cl.
| | |
|---|---|
| *G06K 9/00* | (2006.01) |
| *B60R 11/04* | (2006.01) |
| *B60W 30/18* | (2012.01) |
| *B60W 40/04* | (2006.01) |

(Continued)

(52) U.S. Cl.
CPC ............ *G06V 20/584* (2022.01); *B60R 11/04* (2013.01); *B60W 30/18154* (2013.01); *B60W 40/04* (2013.01); *B60W 50/14* (2013.01); *B60R 2300/105* (2013.01); *B60W 2050/146* (2013.01);

(Continued)

(58) Field of Classification Search
CPC ............... B60R 11/04; B60R 2300/105; B60R 2300/106; B60R 2300/107; B60R 2300/102; B60R 2300/101; B60R 2300/103; G06K 9/00825; G06K 9/3233;

(Continued)

(56) References Cited

U.S. PATENT DOCUMENTS 8,761,991 B1 6/2014 Ferguson et al.
9,158,980 B1 * 10/2015 Ferguson ......... G08G 1/096716

(Continued)

FOREIGN PATENT DOCUMENTS

| JP | 2008-293277 A | 12/2008 |
| JP | 2016-38757 A | 3/2016 |

*Primary Examiner* — Nathnael Aynalem
(74) *Attorney, Agent, or Firm* — Dinsmore & Shohl LLP

(57) ABSTRACT

A traffic signal display estimation system recognizes, based on the position information of a vehicle and a traffic signal information, a traffic signal included in a camera image, identifies a traffic signal display for each recognized traffic signal, and calculates, for each traffic signal, a first evaluation value indicating the certainty of the identified traffic signal display. The system integrates, based on a traffic-signal-to-traffic-signal relational information, a forward traffic signal that is ahead of the travelling direction and that the vehicle should follow and a traffic signal correlated with the forward traffic signal in terms of the traffic signal display, among a plurality of recognized traffic signals. When there is an inconsistency in traffic signal displays identified between a plurality of integrated traffic signals, the system determines a first estimated traffic signal display of the forward traffic signal, based on the first evaluation value for each traffic signal.

11 Claims, 28 Drawing Sheets

(51) Int. Cl.
*B60W 50/14* (2020.01)
*G06V 20/58* (2022.01)

(52) U.S. Cl.
CPC ..... *B60W 2520/06* (2013.01); *B60W 2555/60* (2020.02); *B60W 2556/50* (2020.02)

(58) Field of Classification Search
CPC .. G06K 9/00791; G06K 9/00818; G08G 1/04; G08G 1/09623; G08G 1/095
USPC ........................................................ 348/148
See application file for complete search history.

(56) References Cited

U.S. PATENT DOCUMENTS

| | | | |
|---|---|---|---|
| 2012/0288138 A1* | 11/2012 | Zeng | G08G 1/09623 382/103 |
| 2013/0253754 A1* | 9/2013 | Ferguson | G06K 9/00791 701/28 |
| 2014/0277901 A1 | 9/2014 | Ferguson et al. | |
| 2016/0054138 A1* | 2/2016 | Kojo | B60R 11/04 701/423 |
| 2018/0053059 A1* | 2/2018 | Mei | G06K 9/00818 |
| 2018/0300565 A1 | 10/2018 | Qin et al. | |
| 2019/0244041 A1* | 8/2019 | Kawanai | G06K 9/00825 |

\* cited by examiner

Fig. 2

<Traffic Signal Information>

| Position [X,Y,Z] | Orientation $\{e_x, e_y, e_z\}$ | Type |
|---|---|---|
|  |  |  |
|  |  |  |
| . . . | . . . | . . . |

51

Fig. 11
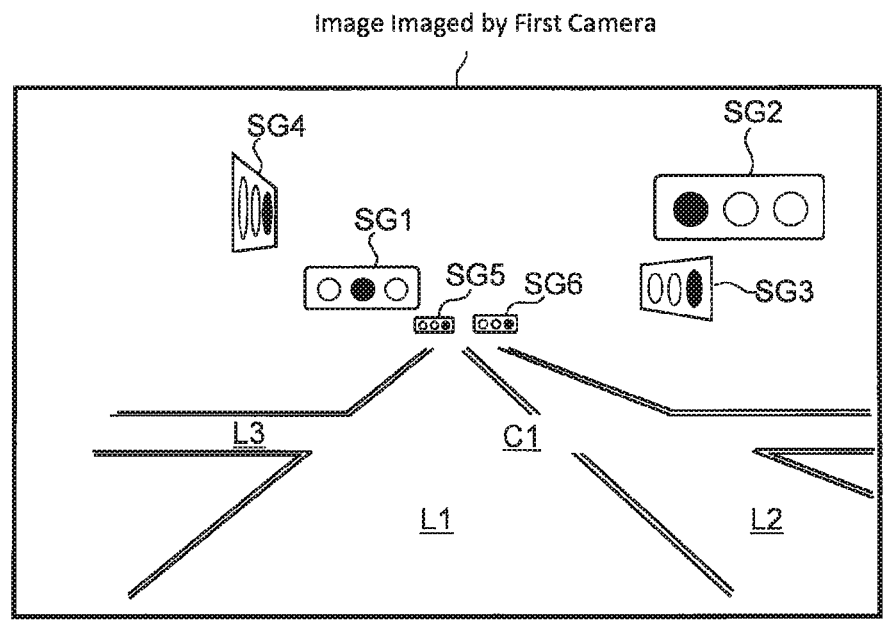
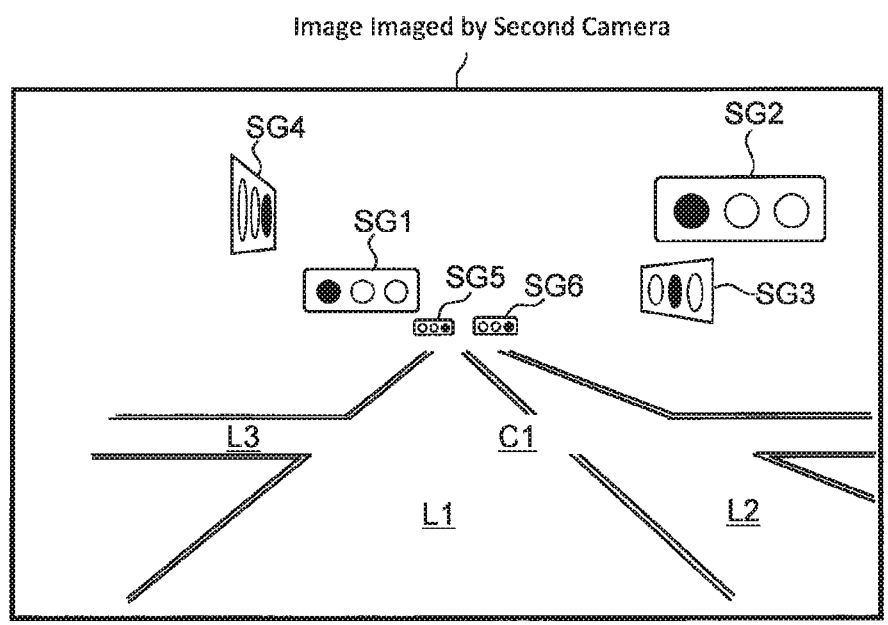

Fig. 12

<Traffic-Signal-to-Traffic-Signal Relational Information>

| Subject Traffic Signal | Related Traffic Signal | |
|---|---|---|
| SG1 | Same | SG2 |
| | Opposite | SG3, (SG4) |
| SG5 | Same | SG6 |
| | Opposite | ... |
| ⋮ | ⋮ | ⋮ |

52

Fig. 21
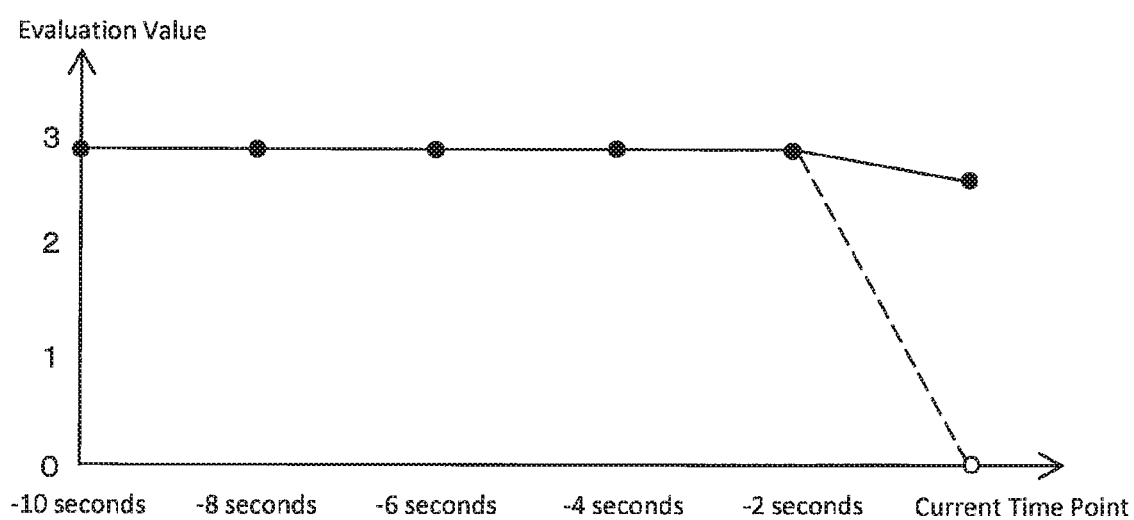
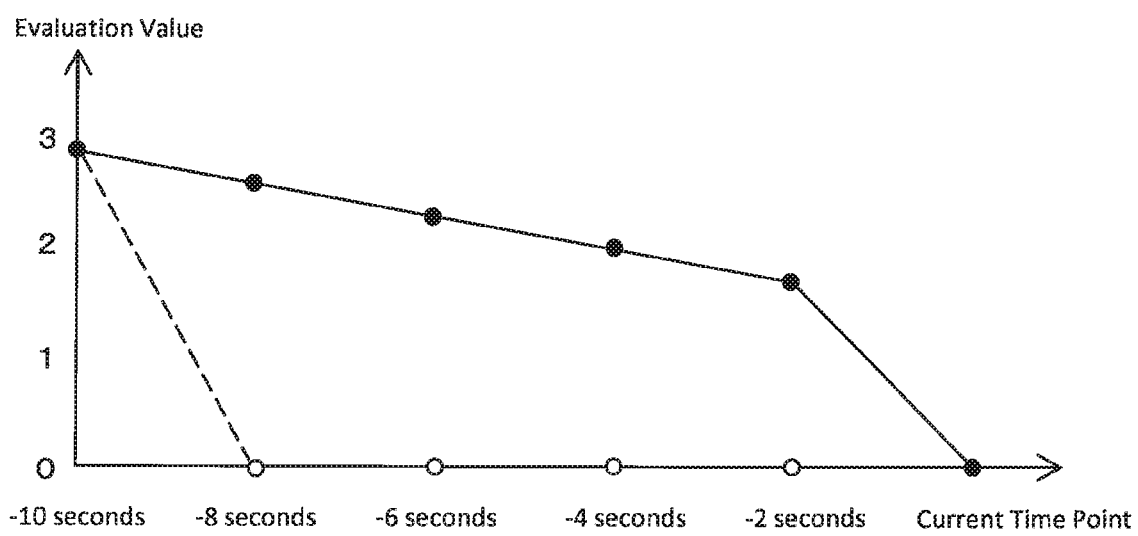

TRAFFIC SIGNAL DISPLAY ESTIMATION SYSTEM

CROSS-REFERENCE TO RELATED APPLICATION

The present disclosure claims priority under 35 U.S.C. § 119 to Japanese Patent Application No. 2019-135553, filed on Jul. 23, 2019. The content of which is incorporated herein by reference in its entirety.

BACKGROUND

Technical Field

The present disclosure relates to a traffic signal display estimation system configured to recognize a traffic signal appearing in a traveling direction of a vehicle from an image of a camera and estimate the traffic signal display of the traffic signal.

Background Art

According to a method disclosed in US 2013/0253754 A1, a target region in which a traffic signal is normally positioned is scanned by a camera to acquire a target region information, and the traffic signal is detected from the target region information. Determination of the position of the traffic signal and determination of the display state of the traffic signal are also performed. Determination of the reliability of the traffic signal is further performed. This determination of the reliability is made, for example, by comparing the position of the traffic signal with the position of a plurality of known traffic signals. Furthermore, according to the method described above, the vehicle is controlled in an autonomous mode based on the display state of the traffic signal and the reliability of the traffic signal.

SUMMARY

A plurality of traffic signals are arranged at an intersection, for example. An images imaged by an on-board camera may include this plurality of traffic signals. Also, for example, on a road with good visibility, a traffic signal located farther away from the vehicle on which the camera is mounted may be seen ahead of a traffic signal located closer to the vehicle. In this situation, a plurality of traffic signals may also be included in the image of the camera. As just described, the number of traffic signals recognized from the image of the camera may not always be one, and a plurality of traffic signals may be recognized at a time. However, according to the method disclosed in US 2013/0253754 A1, when a plurality of traffic signals are recognized, the traffic signal display of a traffic signal that is ahead of vehicle in the traveling direction and that the vehicle should follow may be erroneously recognized.

The present disclosure has been made to address the problem described above, and an object of the present disclosure is to provide a traffic signal display estimation system that, in a situation in which a plurality of traffic signals subject to recognition are detected, can accurately estimate a traffic signal display of a traffic signal that is ahead of the traveling direction and that the vehicle should follow.

A traffic signal display estimation system according to the present disclosure includes: a camera mounted on a vehicle to image a scene ahead of the vehicle in a traveling direction thereof; a computer linked to the camera; and a storage device coupled to the computer. The camera mounted on the vehicle may be one or more. The storage device may be mounted on the vehicle together with the computer and the one or more cameras, and be coupled to the computer directly via a network in the vehicle. In addition, the storage device may alternatively be located outside the vehicle (e.g., on the Internet) and be connected to the computer using a wireless communication.

The storage device includes a traffic signal database including a traffic signal information that indicates the position and orientation of a traffic signal. The position of the traffic signal indicated by the traffic signal information is the absolute position in the three-dimensional space, and the orientation of the traffic signal indicated by the traffic signal information is the orientation in the three-dimensional space. The storage device also includes a relational database including a traffic-signal-to-traffic-signal relational information that indicates the relationship of traffic signal display between a plurality of traffic signals. The relationship of the traffic signal display between the traffic signals indicated by the traffic-signal-to-traffic-signal relational information includes, for example, the presence or absence of the correlation of the color of lights between the traffic signals, and the contents of the correlation.

The computer physically includes a processor and a memory to store a program. The program stored in the memory is configured, when executed by the processor, to cause the computer to execute the following traffic signal recognition processing, traffic signal display identification processing, first evaluation value calculation processing, traffic signal integration processing and traffic signal display estimation processing.

In the traffic signal recognition processing, the computer recognizes, based on the position information of the vehicle and the traffic signal information, a traffic signal included in a camera image imaged by the one or more cameras. The position of a camera mentioned here is the absolute position in the three-dimensional space. If the position and orientation of a traffic signal with respect to the position of the vehicle is known, it is possible to identify the region in which the traffic signal may be present in a camera image. Thus, the traffic signal contained in the camera image can be easily recognized.

The traffic signal recognition processing may include processing to select a traffic signal located within a specified distance from the one or more cameras using the position information of the vehicle and the traffic signal information and recognize the selected traffic signal in the camera image. Also, the traffic signal recognition processing may include processing to select a traffic signal located within the angle of view of the one or more cameras using the position information of the vehicle and the traffic signal information and recognize the selected traffic signal in the camera image. Moreover, the traffic signal recognition processing may include processing to calculate the degree of confrontation of each traffic signal with respect to the one or more cameras using the position information of the vehicle and the traffic signal information and recognize, in the camera image, a traffic signal having the degree of confrontation higher than or equal to a threshold value. Furthermore, the traffic signal recognition processing may include processing to calculate an elevation angle of each traffic signal with respect to the one or more cameras using the position information of the vehicle and the traffic signal information, calculate the altitude of sun using the position of the vehicle and time, and recognize, in the camera image, a traffic signal having an elevation angle smaller than or equal to an elevation angle threshold value determined from the altitude of the sun.

In the traffic signal display identification processing, the computer identifies a traffic signal display for each traffic signal recognized by the traffic signal recognition processing. The traffic signal display refers to the display of the color of lights of a traffic signal defined by traffic laws and regulations. A known image processing (e.g., an image processing using machine learning) can be used to identify the traffic signal display.

In the first evaluation value calculation processing, the computer calculates, for each traffic signal, a first evaluation value indicating the certainty of the traffic signal display identified by the traffic signal recognition processing. The first evaluation value may be a likelihood obtained by an image processing using a machine learning. Also, the first evaluation value may be calculated based on, for example, the identification conditions of an identified traffic signal display, the position relationship between the traffic signal and the vehicle in the real space, the position of the recognized traffic signal in the camera image, and/or a change of the identification results with a lapse of time. Moreover, the first evaluation value may be recalculated in accordance with, for example, specified rules each time the vehicle passes through or approaches the traffic signal.

The first evaluation value calculation processing may include processing to increase each of the first evaluation values of traffic signal displays of two particular traffic signals recognized by the traffic signal recognition processing when the relationship of traffic signal displays identified by the traffic signal display identification processing is consistent, between the two particular traffic signals, with the traffic-signal-to-traffic-signal relational information. According to this processing, by using the traffic-signal-to-traffic-signal relational information to evaluate the certainty of the traffic signal display, it is possible to increase the accuracy of the first evaluation value.

Also, the first evaluation value calculation processing may include processing to calculate a distance from the center of the camera image of each of traffic signals recognized by the traffic signal recognition processing and increase, by a greater amount, the first evaluation value of the traffic signal display of a traffic signal in which the distance is shorter. According to this processing, by using the relative position relationship between the camera and the traffic signal in the camera image to evaluate the certainty of the traffic signal display, it is possible to increase the accuracy of the first evaluation value.

Moreover, the first evaluation value calculation processing may include processing to calculate, using the position information of the vehicle and the traffic signal information, a traffic signal vector indicating the orientation of each of traffic signals recognized by the traffic signal recognition processing with respect to the one or more cameras in the real space and decrease, by a greater amount, the first evaluation value of the traffic signal display of a traffic signal in which an angle between a vehicle vector indicating the traveling direction of the vehicle in the real space and the traffic signal vector is greater. According to this processing, by using the relative position relationship between the camera and the traffic signal in the real space to evaluate the certainty of the traffic signal display, it is possible to increase the accuracy of the first evaluation value.

The first evaluation value calculation processing may include processing to calculate the degree of obstruction of each of traffic signals recognized by the traffic signal recognition processing and obstructed by another target object and decrease, by a greater amount, the first evaluation value of the traffic signal display of a traffic signal in which the degree of obstruction is higher. According to this processing, it is possible to reduce the adverse effect, on the estimation results, of a traffic signal having a high degree of obstruction and a low accuracy of the traffic signal display.

Moreover, with respect to a traffic signal in which the traffic signal display is identified in the traffic signal display identification processing executed at a past time point but the traffic signal display is not identified in the traffic signal display identification processing executed at the current time point, the first evaluation value calculation processing may include processing to calculate the first evaluation value at the current time point based on the first evaluation value at the past time point and an elapsed time from the past time point. According to this processing, when the traffic signal display is not identified temporarily due to, for example, an obstruction object, the first evaluation value can be prevented from being sharply decreased, and the continuity of the identification results of the traffic signal display can be maintained.

Furthermore, with respect to a particular traffic signal recognized in the traffic signal recognition processing, the first evaluation value calculation processing may include processing to increase the first evaluation value of the traffic signal display of the particular traffic signal in accordance with number of consecutive identification times of the same traffic signal display when the same traffic signal display is continuously identified in multiple times by the traffic signal display identification processing. When a plurality of integrated traffic signals include a traffic signal whose identification result of the traffic signal display is fluctuating, the first evaluation value of the traffic signal display of this kind of traffic signal relatively decreases. Therefore, according to this processing, hunting of the final estimation result due to the influence of this kind of traffic signal can be prevented.

In the traffic signal integration processing, the computer integrates, based on the traffic-signal-to-traffic-signal relational information, a forward traffic signal that is ahead of the travelling direction and that the vehicle should follow and a traffic signal correlated with the forward traffic signal in terms of the traffic signal display, among a plurality of traffic signals recognized by the traffic signal recognition processing. The integration mentioned here refers to selecting all the traffic signals that have the correlation in traffic signal display with the forward traffic signal from among a plurality of recognized traffic signals and treating the selected traffic signals as a single group.

In the first traffic signal display estimation processing, when there is an inconsistency in traffic signal displays identified by the traffic signal display identification processing between a plurality of traffic signals integrated in the traffic signal integration processing, the computer determines a first estimated traffic signal display of the forward traffic signal, based on a traffic signal display of a traffic signal highest in the first evaluation value calculated by the first evaluation calculation processing. The inconsistency mentioned here means the inconsistency with respect to the relationship of the traffic signal display between traffic signals indicated by the traffic-signal-to-traffic-signal relational information. If there is not this inconsistency, the traffic signal display of the forward traffic signal identified by the traffic signal display identification processing can be estimated to be the actual traffic signal display.

As a result of a series of processing described above being executed by the computer, when a plurality of traffic signals are recognized in one camera image, or when, in an example of a plurality of cameras are mounted, a plurality of traffic signals are recognized from a plurality of camera images, the forward traffic signal is integrated with one or more traffic signals that have the correlation in traffic signal display with the forward traffic signal among the plurality of recognized traffic signals. According to this integration, even if the traffic signal display of the forward traffic signal cannot be well identified, the traffic signal display of the forward traffic signal can be estimated from the traffic signal displays of other integrated traffic signals. Also, even if there is the inconsistency in the traffic signal display between a plurality of integrated traffic signals, the first estimated traffic signal display of the forward traffic signal is determined based on the traffic signal display of a traffic signal highest in the first evaluation value that indicates the certainty of the traffic signal display. Therefore, according to the traffic signal display estimation system according to the present disclosure, it is possible to accurately estimate the traffic signal display of the traffic signal that is ahead of the traveling direction and that the vehicle should follow.

The traffic signal display estimation system according to the present disclosure may further include an external sensor configured to detect a target object around the vehicle. The external sensor is exemplified by a LIDAR and a millimeter-wave radar. The program stored in the memory of the computer may be configured, when executed by the processor, to cause the computer to further execute the following second traffic signal display estimation processing, second evaluation value calculation processing and estimation result selection processing.

In the second traffic signal display estimation processing, the computer determines a second estimated traffic signal display of the forward traffic signal based on the behavior of the target object detected by the external sensor. Vehicles around the own vehicle are also driven in accordance with traffic signals similarly to the own vehicle. Therefore, by detecting a vehicle around the own vehicle as a target object, the traffic signal display (second estimated traffic signal display) of the forward traffic signal can be estimated from the behavior of the target object.

In the second evaluation value calculation processing, the computer calculates a second evaluation value indicating the certainty of the second estimated traffic signal display of the forward traffic signal determined by the second traffic signal display estimation processing. The second evaluation value may be calculated based on, for example, the reliability of tracking of a target object, or the variance of the position or velocity of a target object.

In the estimation result selection processing, the computer selects, as a final estimation result, the first estimated traffic signal display determined by the first traffic signal display estimation processing when the first evaluation value associated with the first estimated traffic signal display determined by the first traffic signal display estimation processing is greater than the second evaluation value calculated by the second evaluation value calculation processing. On the other hand, the computer selects, as the final estimation result, the second estimated traffic signal display determined by the second traffic signal display estimation processing when the first evaluation value associated with the first estimated traffic signal display determined by the first traffic signal display estimation processing is smaller than or equal to the second evaluation value calculated by the second evaluation value calculation processing.

According to the above-described second traffic signal display estimation processing, second evaluation value calculation processing and estimation result selection processing that are further executed by the computer, even when the estimation accuracy of the traffic signal display based on the camera image cannot be ensured, the traffic signal display of the forward traffic signal that is ahead of the traveling direction and that the vehicle should follow can be estimated based on the behavior of the surrounding vehicle.

As described so far, according to the traffic signal display estimation system according to the present disclosure, in a situation in which a plurality of traffic signals subject to recognition are detected, it is possible to accurately estimate a traffic signal display of a traffic signal that is ahead of the traveling direction of a vehicle and that the vehicle should follow.

BRIEF DESCRIPTION OF THE DRAWINGS

FIG. 2 is a conceptual diagram used to describe an example of traffic signal information according to the embodiment of the present disclosure;

FIG. 11 is a conceptual diagram used to describe an example of a camera image including a plurality of traffic signals imaged by two cameras according to the embodiment of the present disclosure;

FIG. 12 is a conceptual diagram used to describe an example of traffic-signal-to-traffic-signal relational information according to the embodiment of the present disclosure;

FIG. 21 is a conceptual diagram used to describe still another example of the first evaluation value calculation processing according to the embodiment of the present disclosure;

DETAILED DESCRIPTION

In the following, embodiments according to the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. Outline of Driving Support Control System

Figure 1:
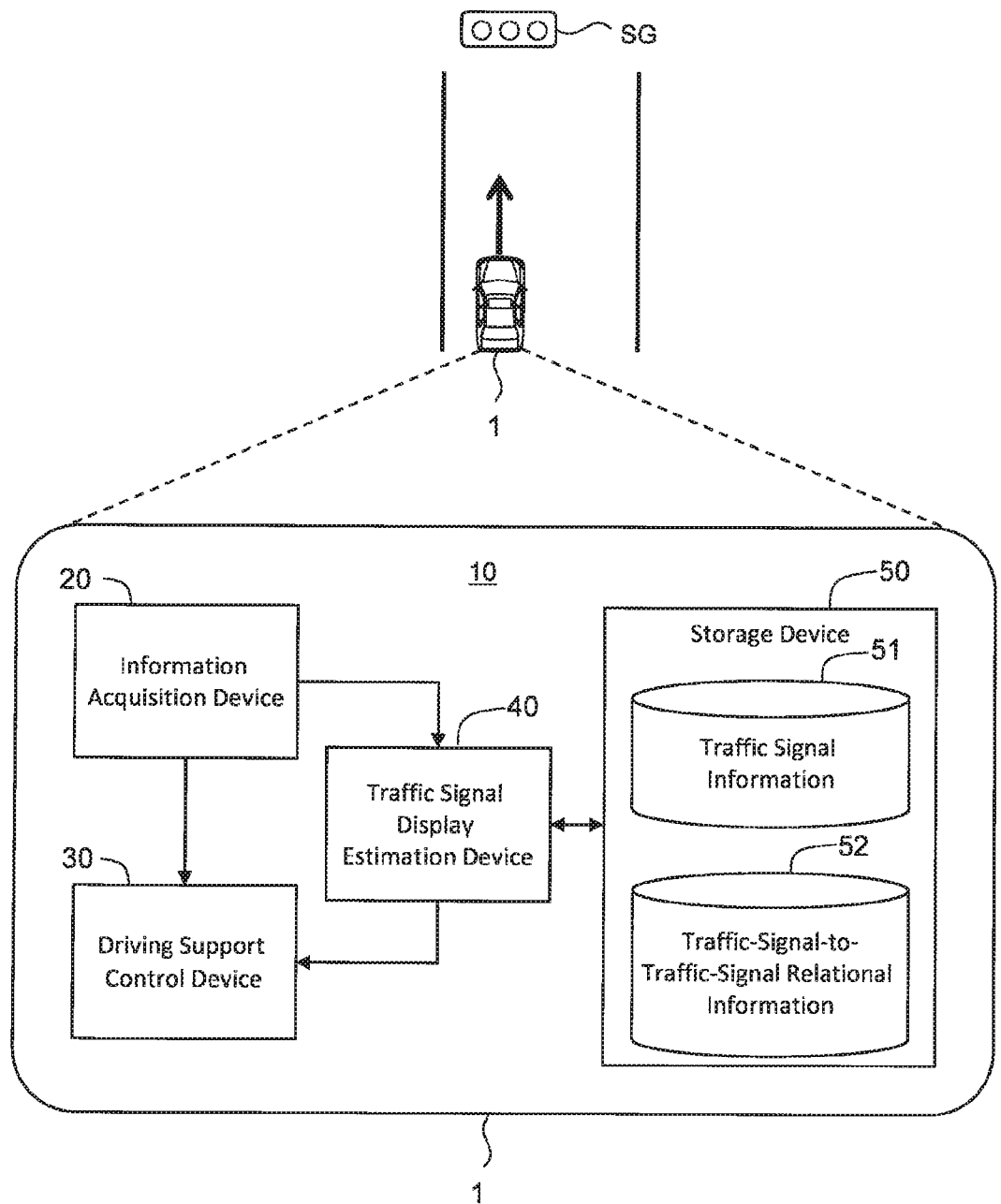
FIG. 1 is a block diagram showing a driving support control system according to an embodiment of the present disclosure.

A traffic signal display estimation system according to the present embodiment is configured as a part of a driving support control system. FIG. 1 is a conceptual diagram used to describe the outline of a driving support control system 10 according to the present embodiment. The driving support control system 10 is a control system configured to achieve a level 3 or more automated driving level in the level definition of, for example, SAE (Society of Automotive Engineers).

The driving support control system 10 includes a driving support control device 30. The driving support control device 30 performs a driving support control for supporting the driving of a vehicle 1. Typically, the driving support control includes at least one of steering control, acceleration control and deceleration control. This kind of driving support control is exemplified by an autonomous driving control, a path-following control, a lane tracing assist control and a collision avoidance control.

The driving support control system 10 includes an information acquisition device 20. In the driving support control, various types of information acquired by the information acquisition device 20 are used. The information acquisition device 20 acquires various types of information using sensors mounted on the vehicle 1 and Vehicle-to-Everything (V2X) communication. The V2X communication includes, for example, Vehicle-to-Vehicle (V2V) communication, Vehicle-to-Infrastructure (V2I) communication and Vehicle-to-Network (V2N) communication. The information acquired by the on-board sensors and the V2X communication includes vehicle position information indicating the position of the vehicle 1, vehicle state information indicating the state of the vehicle 1, and surrounding situation information indicating the situation of surrounding of the vehicle 1, for example. Among those various information, the traffic signal display of a traffic signal SG ahead of the vehicle 1 is one of the pieces of information particularly important in the driving support control.

The driving support control system 10 includes a traffic signal display estimation device 40. The traffic signal display estimation device 40 has a function of processing the information acquired by the information acquisition device 20 (in detail, a camera image imaged by an on-board camera), a function of using the information of databases 51 and 52 stored in a storage device 50, and a function of identifying or estimating a traffic signal display of the traffic signal SG ahead of the vehicle 1. A "traffic signal display estimation system" is configured by this traffic signal display estimation device 40 together with the camera included in the information acquisition device 20 and the storage device 50.

The traffic signal display identified or estimated by the traffic signal display estimation device 40 is used in the driving support control performed by the driving support control device 30. For example, in accordance with the identified traffic signal display, the driving support control device 30 decelerates the vehicle 1, stops it at a specified position, or restarts it.

Hereinafter, the details of the functions of the traffic signal display estimation device 40 provided to configure the "traffic signal display estimation system" and the details of the databases 51 and 52 will be described in detail.

2. Traffic Signal Information

The traffic signal display estimation device 40 uses traffic signal information to identify or estimate a traffic signal display. The traffic signal information is a map information relating to traffic signals SG and indicates the position and orientation of each of the traffic signals SG. The position of the traffic signal indicated by the traffic signal information is the absolute position in a three-dimensional space and is defined in the absolute coordinate system (latitude, longitude and altitude). The orientation of the traffic signal indicated by the traffic signal information is an orientation in the three-dimensional space and is defined by a unit vector. The traffic signal database 51 is a collection of this kind of traffic signal information. As shown in FIG. 1, the traffic signal database 51 is stored in the storage device 50.

FIG. 2 is a conceptual diagram used to describe an example of the traffic signal information according to the present embodiment. In the example shown in FIG. 2, the traffic signal information includes the position of traffic signal (absolute position [X, Y, Z]), the orientation of traffic signal (unit vector ($e_x$, $e_y$, $e_z$)), and the type of traffic signal. That is to say, the position, orientation and type of a traffic signal SG configure one data set. The type of traffic signal means an arrangement of lights. For example, in Japan, traffic signals having circular lights of three colors of blue (green), yellow and red are arranged horizontally in a row are common. However, traffic signals having three color lights arranged in the upper stage and one or more blue arrow lights arranged in the lower stage to indicate one or more permitted traveling directions are also common.

3. Traffic Signal Recognition Processing

Figure 3:
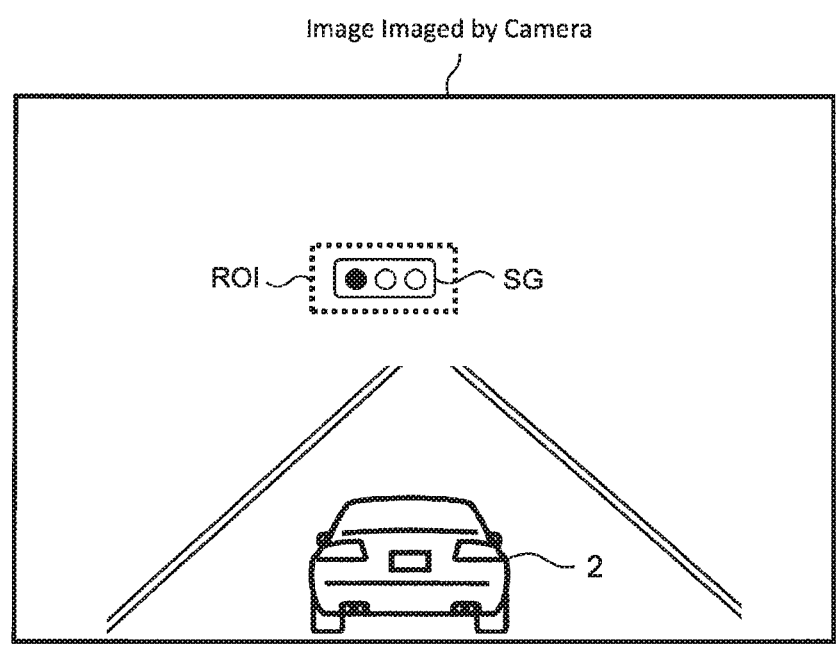
FIG. 3 is a conceptual diagram used to describe a camera image according to the embodiment of the present disclosure.

The traffic signal information is useful in traffic signal recognition processing to recognize a traffic signal SG included in the camera image imaged by an on-board camera. FIG. 3 is a conceptual diagram used to describe a camera image according to the present embodiment. In the example shown in FIG. 3, the camera image includes a traffic signal SG ahead of the vehicle 1 and a preceding vehicle 2. In FIG. 3, the traffic signal SG is represented by three lights arranged horizontally in a row and an outer border. It should be noted that, in each drawing including a figure representing a traffic signal, a light represented by a white circle means the light that appears to be turned off in the camera image, and, on the other hand, a light represented by a black circle means the light that appears to be turned on in the camera image. In the camera image exemplified in FIG. 3, the blue light appears to be turned on.

A dotted border in the camera image indicates a region of interest (hereinafter, referred to as "ROI") in the traffic signal recognition processing, i.e., a region in which a traffic signal may be present in the camera image. The absolute position of the camera in the three-dimensional space can be regarded as equal to the absolute position of the vehicle 1 in the three-dimensional space, which can be acquired from a GPS receiver. By referring to the position information of the camera that can be acquired from the GPS receiver (the position information of the vehicle) and the position and orientation of the traffic signal SG included in the traffic signal information, it is possible to narrow down the ROI in accordance with the position and orientation of the traffic signal with respect to the position of the camera. Moreover, it is possible to adjust the ROI in accordance with the type of the traffic signal included in the traffic signal information. This greatly contributes not only to improving the accuracy and stability of the traffic signal recognition processing but also to reducing the amount of calculation required for the traffic signal recognition processing.

4. Preprocessing of Traffic Signal Recognition Processing

In the traffic signal recognition processing, in order to set the ROI, projection transformation of the individual traffic signals identified by the traffic signal information into the camera image is performed. In performing the projection transformation, limiting the number of the traffic signals subject to the projection transformation can reduce the computational load on the traffic signal recognition processing. An example of this kind of preprocessing will be described with reference to FIGS. 4 to 7. It should be noted that the following examples of the preprocessing can be performed in combination as appropriate.

Figure 4:
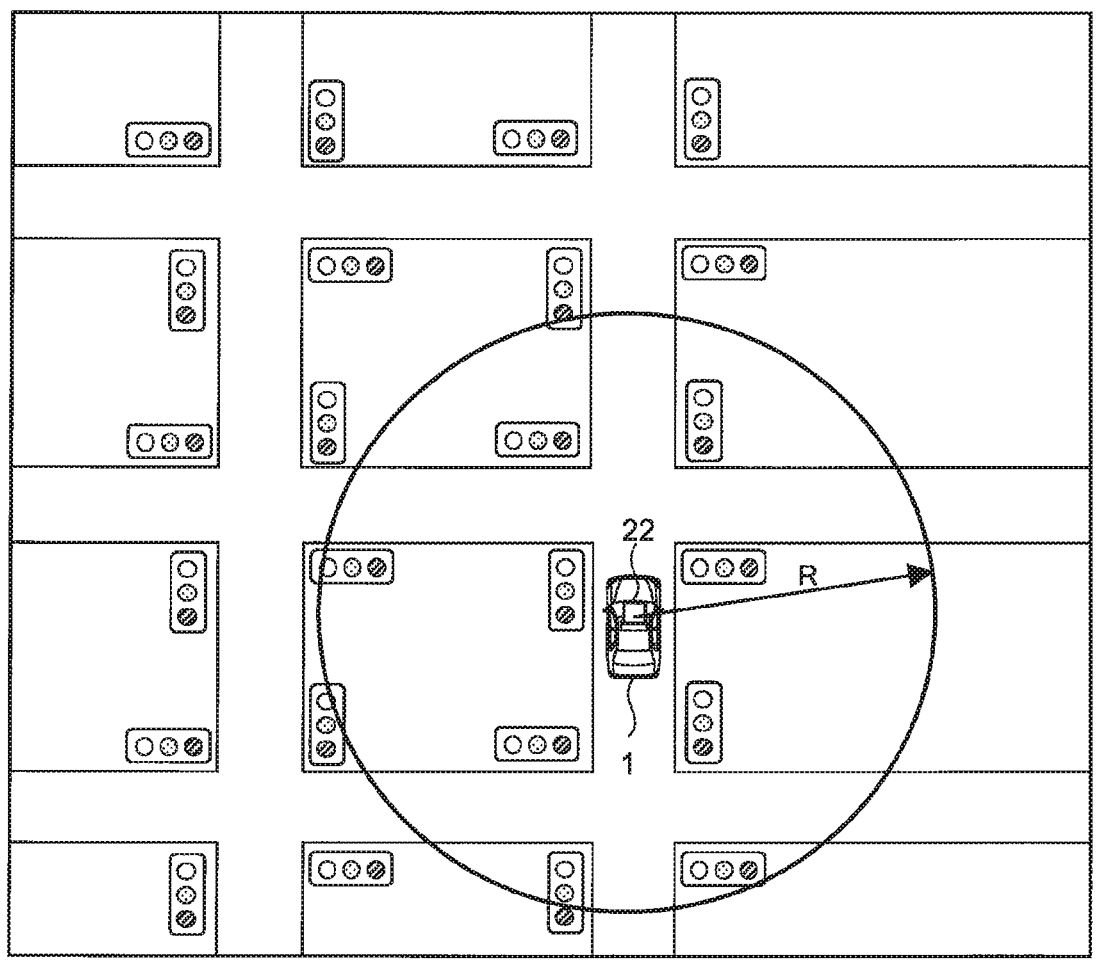
FIG. 4 is a conceptual diagram used to describe an example of traffic signal recognition processing according to the embodiment of the present disclosure.
Figure 5:
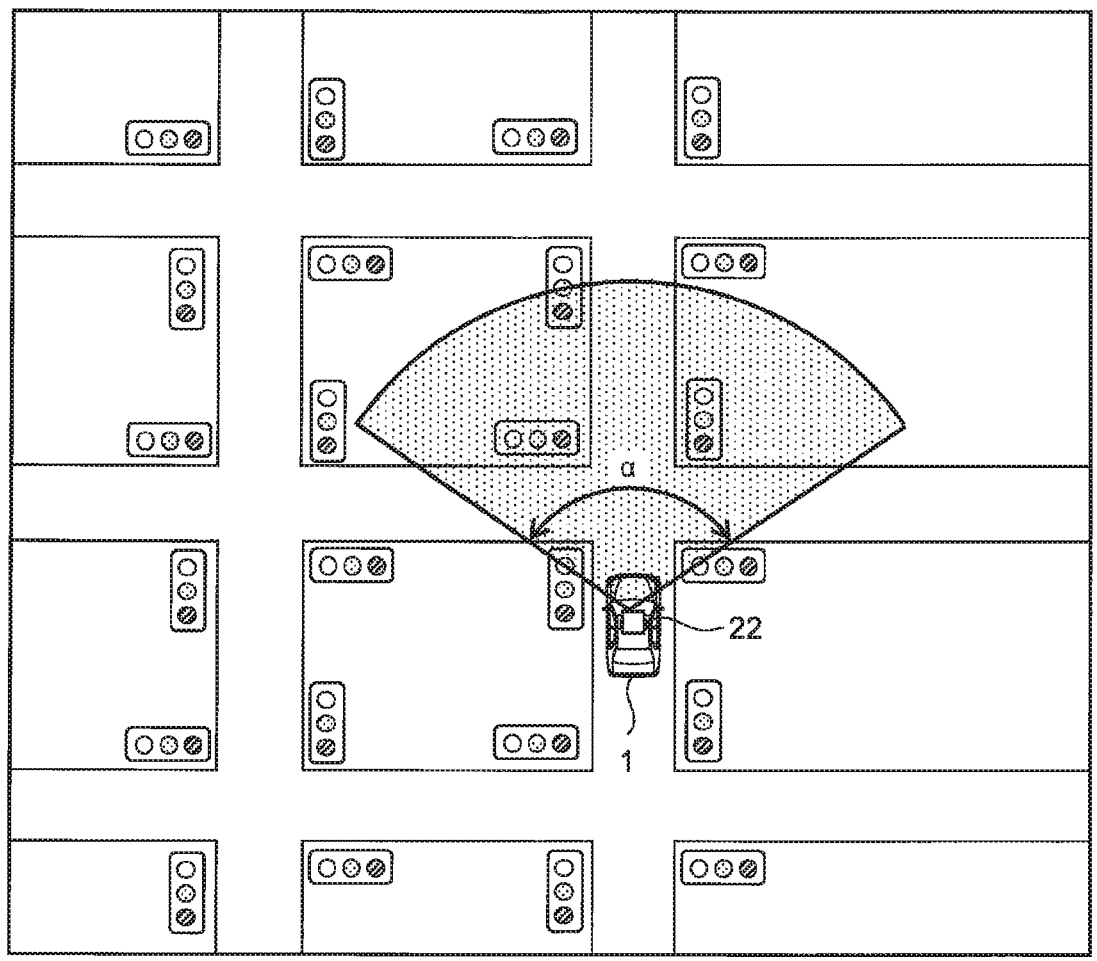
FIG. 5 is a conceptual diagram used to describe another example of the traffic signal recognition processing according to the embodiment of the present disclosure.
Figure 6:
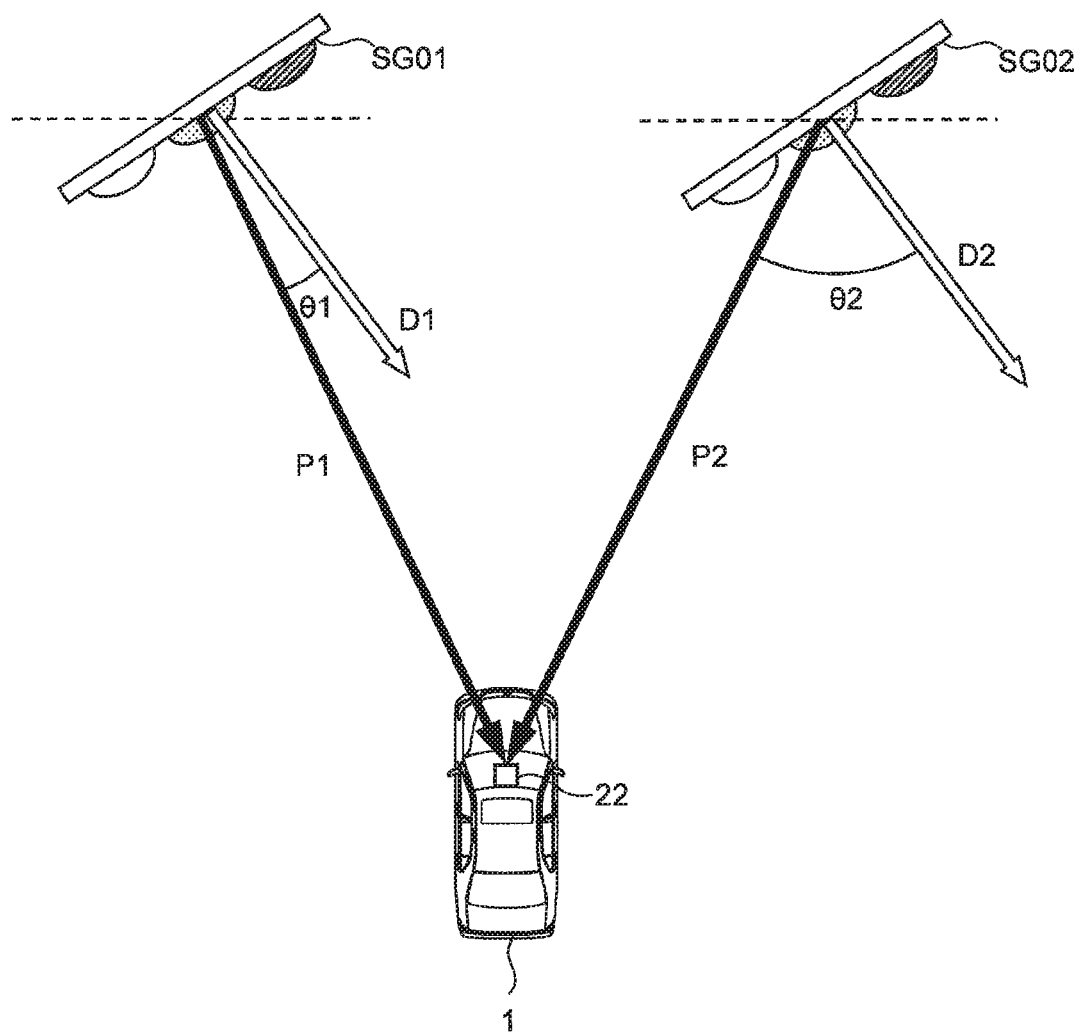
FIG. 6 is a conceptual diagram used to describe still another example of traffic signal recognition processing according to the embodiment of the present disclosure.

First, an example in which the traffic signal information is used in the preprocessing of the traffic signal recognition processing will be described. In an example, as shown in FIG. 4, traffic signals located within a specified distance R from the camera 22 mounted on the vehicle 1 are selected, and only the selected traffic signals are recognized in the camera image. Also, in another example, as shown in FIG. 5, traffic signals located within an angle α of view of the camera 22 are selected, and only the selected traffic signals are recognized in the camera image. In these examples of the preprocessing, the position information of each traffic signal included in the traffic signal information is used, and the relative position of each traffic signal with respect to the position of the camera 22 is calculated. It should be noted that, as described above, the position of the camera 22 means the position of the vehicle 1 that can be acquired by the GPS receiver.

Alternatively, it is possible to narrow down traffic signals subject to the traffic signal recognition processing using not only the position information of each of the traffic signals included in the traffic signal information but also the orientation information thereof. In the example shown in FIG. 6, two traffic signals SG01 and SG02 are located ahead of the vehicle 1. The two traffic signals SG01 and SG02 are equal in distance from the vehicle 1, but there is a difference in the incident angles θ1 and θ2 of the camera 22 with respect to the respective traffic signals SG01 and SG02. In the present embodiment, the cosines of the incident angles θ1 and θ2 (i.e., cos θ1 and cos θ2) are respectively defined as the degree of confrontation of the traffic signals SG01 and SG02 with respect to the camera 22. When the relative position vectors from the traffic signals SG01 and SG02 to the camera 22 are respectively referred to as P1 and P2 and that the normal vectors of the traffic signals SG01 and SG02 are respectively referred to as D1 and D2, the degrees cos θ1 and cos θ2 of confrontation are calculated by equations shown in FIG. 6. It is difficult for a traffic signal having a low degree of confrontation to identify whether the lights of the traffic signal are turned on or off. Therefore, in this example, only traffic signals having the degree of confrontation higher than or equal to a threshold value are recognized in the camera image. It should be noted that the orientation information of each traffic signal is used for the calculation of the normal vector, and the position information of each traffic signals is used for the calculation of the relative position vector.

Figure 7:
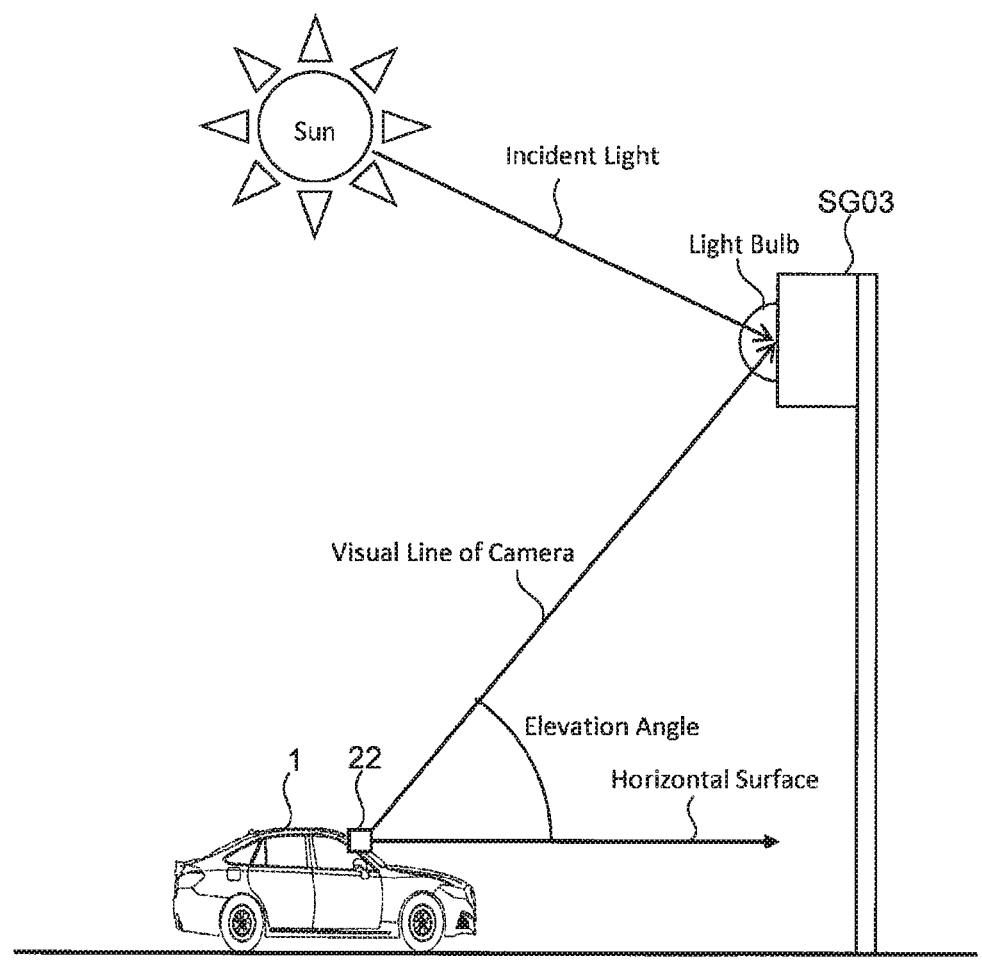
FIG. 7 is a conceptual diagram used to describe yet another example of traffic signal recognition processing according to the embodiment of the present disclosure.

The traffic signal information can also be used to identify traffic signals that may have the possibility of pseudo lighting. The pseudo lighting is a phenomenon that, in a traffic signal using non-LED lights, although the light is actually not lit, it appears to be lit due to the reflection of sunlight from a bulb of the light. By excluding a traffic signal having the possibility of the pseudo lighting from the traffic signal recognition processing in advance, it is possible to reduce the computational load on the traffic signal recognition processing. Referring to FIG. 7, whether or not the pseudo lighting occurs depends on the elevation angle of a traffic signal SG03 with respect to the camera 22 and the altitude of the sun. The elevation angle can be calculated using the position information of the camera 22 and the traffic signal information on the traffic signal SG03. The altitude of the sun can be calculated from the position of the vehicle 1 and time. If the altitude of the sun is known, the incident angle of an incident light from the sun to the light bulbs of the traffic signal SG03 is determined, and an elevation angle threshold value at which the pseudo lighting occurs is therefore uniquely determined. In this example, only traffic signals having an elevation angle with respect to the camera 22 being smaller than or equal to the elevation angle threshold (i.e., only traffic signals having a low probability of the pseudo lighting) are recognized in the camera image.

5. Traffic Signal Display Identification Processing

The traffic signal display estimation device 40 identifies a traffic signal display for each traffic signal recognized by the traffic signal recognition processing. The traffic signal display refers to a display of colors of lights defined by traffic regulations. The colors of the lights are basically three colors of blue, yellow and red. It should be noted that, although the color of the light for permission to proceed is "green" in hue, in Japanese laws and regulations, "green" for permission to proceed is described as "blue", and therefore, the color of the light for permission to proceed permission is also described as "blue" in this specification. The traffic signal displays of traffic signals also include a combination of multiple colors of lights. In an example of a traffic signal, which is adopted in Japan, having lights of three colors of blue, yellow and red arranged in the upper stage and a light of blue arrow arranged in the lower stage, the light of blue arrow may be turned on when the light of red color is turned on.

In the traffic signal display identification processing, an image within the ROI that is set by the traffic signal recognition processing is cut out from a camera image, and a light being turned on is detected in the cut out ROI image. Then, the position of the light during lighting in the ROI image is calculated, and identification of the traffic signal display of the traffic signal is performed based on the color and position of the light during lighting. Detection of the light during lighting is performed using image processing by a known machine learning. The method of machine learning for the traffic signal display identification processing is not limited. For example, a statistical pattern recognition method, such as a Bayesian estimation method or a maximum likelihood estimation method, may be used.

6. Traffic-Signal-to-Traffic-Signal Relational Information

Traffic signals are mainly installed at intersections, and at an intersection, a plurality of traffic signals are arranged including a traffic signal located on the lane where the vehicle 1 is running. In addition, on a road with good visibility, not only a traffic signal at the intersection immediately ahead of the vehicle 1 but also a traffic signal at an intersection located further ahead thereof may enter driver's field of vision. In this situation, a plurality of traffic signals are also included in the image of a camera for imaging a scene ahead of the vehicle 1 in the traveling direction.

Figure 8:
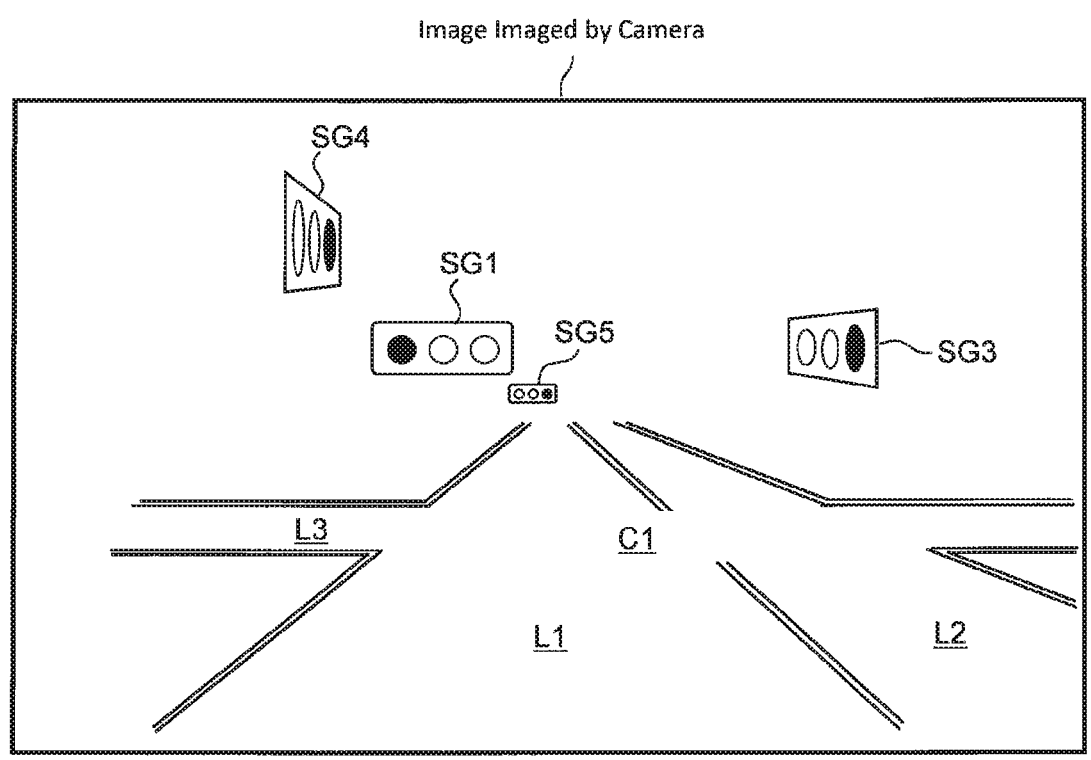
FIG. 8 is a conceptual diagram used to describe an example of a camera image including a plurality of traffic signals according to the embodiment of the present disclosure.
Figure 9:
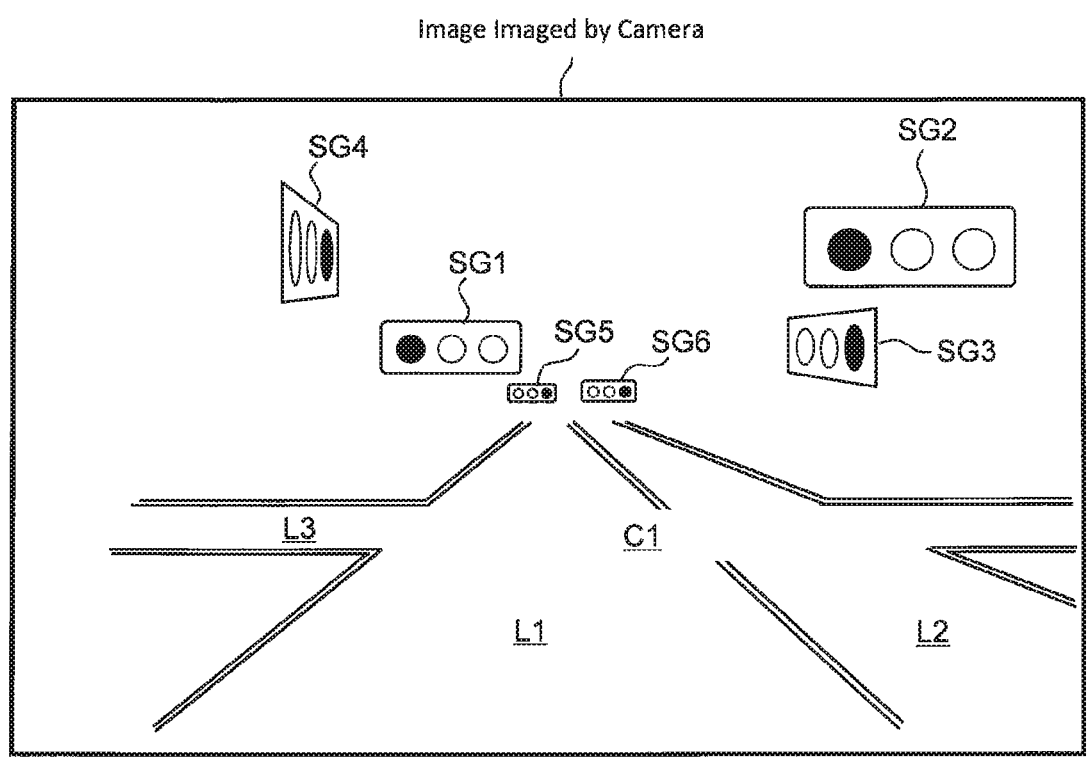
FIG. 9 is a conceptual diagram used to describe another example of the camera image including a plurality of traffic signals according to the embodiment of the present disclosure.

Each of FIGS. 8 and 9 is a conceptual diagram used to describe an example of a camera images including a plurality of signals according to the present embodiment. In the example shown in each figure, the camera image includes a running lane L1 in which the vehicle 1 is traveling, an oncoming lane L2 adjacent thereto, and a crossing lane L3 intersecting with the lanes L1 and L2 at an intersection C1. Also, in the example shown in FIG. 8, four traffic signals SG1, SG3, SG4 and SG5 appear in the camera image in the vicinity of the intersection C1. In the example shown in FIG. 9, six traffic signals SG1, SG2, SG3, SG4, SG5 and SG6 appear in the camera image in the vicinity of the intersection C1. It should be noted that an explanation is herein given by referring to the examples of the camera images which are acquired in a country or a region where the vehicle 1 runs on the left side of the road and traffic signals having lights arranged horizontally in a row are used.

A traffic signal which is located ahead of the vehicle 1 in the traveling direction and which the vehicle 1 should follow is herein referred to as a "forward traffic signal". In the example shown in FIG. 8, among the plurality of traffic signals included in the camera image, a traffic signal corresponding to the forward traffic signal is the traffic signal SG1. The traffic signal SG3 is the traffic signal that vehicles running on the crossing lane L3 from the left side should follow. The traffic signal SG4 is the traffic signal that vehicles running on the crossing lane L3 from the right side should follow. The traffic signal SG5 is the traffic signal located farther than the intersection C1, and is provided for intersections and pedestrian crossings that are not visible in the camera image.

In the example shown in FIG. 9, among the plurality of traffic signals included in the camera image, a traffic signal corresponding to the forward traffic signal described above is the traffic signal SG1 or SG2. The traffic signal SG1 is located on the running lane L1 and is farther than the intersection C1, and the traffic signal SG2 is located on the oncoming lane L2 and is closer than the intersection C1. The traffic signal SG3 is the traffic signal that vehicles running on the crossing lane L3 from the left side should follow. The traffic signal SG4 is the traffic signal that vehicles running on the crossing lane L3 from the right side should follow. The traffic signals SG5 and SG6 are the traffic signals located farther than the intersection C1 and are provided for intersections that are not visible in the camera image.

In the camera image shown in each figure, which position each traffic signal is provided on the road and which orientation each traffic signal faces are clarified by the traffic signal recognition processing using the traffic signal information included in the traffic signal database 51. Further, the traffic signal display of each traffic signal, more specifically the lighting state of the lights of each traffic signal is identified by image processing. In the example shown in FIG. 8, in the traffic signal SG1, the blue-colored light is turned on, and in the traffic signals SG3, SG4 and SG5, the respective red-colored light is turned on. In the example shown in FIG. 9, in the traffic signals SG1 and SG2, the respective blue-colored light is turned on, and in the traffic signals SG3, SG4, SG5 and SG6, the respective red-colored light is turned on. However, for example, due to the influence of reflection of sunlight and obstruction of the lights by, for example, a truck, it is not always possible to accurately identify the traffic signal displays of all the traffic signals.

Where the vehicle 1 is a manually operated vehicle, the identification of the traffic signal displays of traffic signals is performed by the driver. In the example shown in FIG. 8, the driver usually checks the traffic signal display of the traffic signal SG1 and then determines the operation of the vehicle 1 at the intersection C1. If, however, the traffic signal display of the traffic signal SG1 cannot be recognized, the driver can estimate the traffic signal display of the traffic signal SG1 from the traffic signal display of the traffic signal SG3. In addition, although the traffic signal SG4 may be difficult to see from the vehicle 1 running on the running lane L1 as compared to the traffic signal SG3, it is also possible to estimate the traffic signal display of the traffic signal SG1 from the traffic signal display of the traffic signal SG4.

Figure 10:
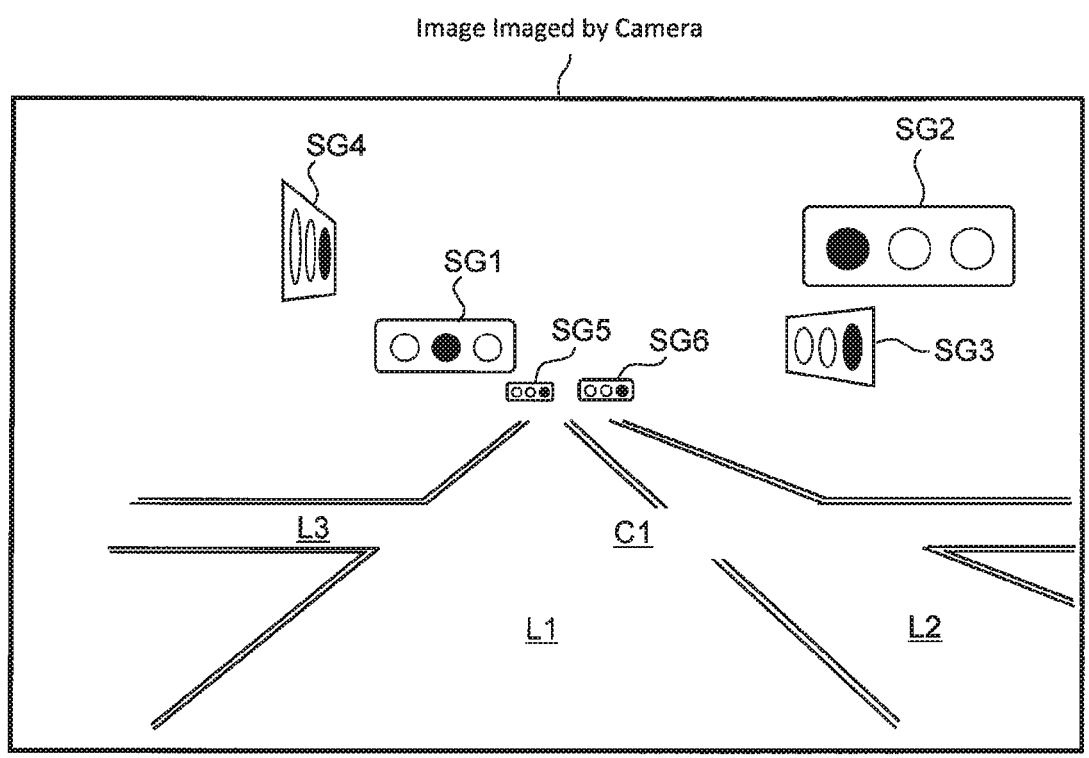
FIG. 10 is a conceptual diagram used to describe still example of the camera image including a plurality of traffic signals according to the embodiment of the present disclosure.

In the example shown in FIG. 9, the driver usually checks the traffic signal display of the traffic signal SG1 or SG2 and then determines the operation of the vehicle 1 at the intersection C1. However, for example, as shown in FIG. 10, due to the influence of reflection of sunlight, the traffic signal SG1 may appear to have the yellow-colored light on despite the traffic signal SG2 having the blue-colored light on. In this kind of situation, by referring to the traffic signal display of the traffic signal SG3 or the traffic signal display of the traffic signal SG4, the driver can judge whether the traffic signal display of the traffic signal SG1 or the traffic signal display of the traffic signal SG2 is correct, and then estimate the traffic signal display of the traffic signal that is ahead of the vehicle 1 in the traveling direction and that the vehicle 1 should follow.

The reason why the driver can make the above-described estimation is that the driver knows that, in the example shown in FIG. 8, there is a correlation in the traffic signal display between the traffic signal SG1 and the traffic signals SG3 and SG4, and that the driver knows that, in the example shown in FIGS. 9 and 10, there is a correlation in the traffic signal display between the traffic signal SG1 and the traffic signals SG2, SG3 and SG4. Conversely, the driver does not estimate the traffic signal display of the traffic signal SG1 from the traffic signal display of the traffic signal SG5 or SG6 because the driver knows that there is no correlation in the traffic signal display between the traffic signal SG1 and the traffic signal SG5 or SG6.

These pieces of information that the driver has as knowledge (that is, the traffic-signal-to-traffic-signal relational information indicating the relationship of the traffic signal display between a plurality of traffic signals) are based on clear traffic laws and regulations, and can therefore be organized in a database as codified knowledge. The relational database 52 shown in FIG. 1 is a database in which relationship information between traffic signals is organized. As shown in FIG. 1, the relational database 52 is stored in the storage device 50.

If the traffic-signal-to-traffic-signal relational information is organized and prepared in advance, when a plurality of traffic signals are recognized in the camera image, it is possible to integrate, on the basis of the traffic-signal-to-traffic-signal relational information, the forward traffic signal, which is ahead of the vehicle 1 in the traveling direction and which the vehicle 1 should follow, and one or more traffic signals having a correlation in the traffic signal display with the forward traffic signal. "Integrating" mentioned here can also be referred to as "grouping". According to this integration, even if the traffic signal display of the forward traffic signal cannot be successfully identified, the traffic signal display of the forward traffic signal can be estimated from one or more traffic signal displays of one or more other integrated traffic signals.

Where a plurality of cameras are mounted on the vehicle 1, the traffic-signal-to-traffic-signal relational information can also be used when a plurality of traffic signals are recognized from a plurality of camera images. FIG. 11 is a conceptual diagram used to describe an example of a camera image including a plurality of traffic signals imaged by two cameras according to the present embodiment. Between a camera image imaged by a first camera and a camera image imaged by a second camera, there is a difference due to the performance of cameras (more specifically, a difference due to the resolution and the manner of imaging, for example). Due to the difference, there may be an inconsistency in the traffic signal display of the traffic signal between the two camera images. In the example shown in FIG. 11, an inconsistency is generated between the traffic signal SG1 included in the camera image of the first camera and the traffic signal SG1 included in the camera image of the second camera, and an inconsistency is also generated between the traffic signal SG3 included in the camera image of the first camera and the traffic signal SG3 included in the camera image of the second camera.

In the situation described above, if the traffic-signal-to-traffic-signal relational information is used, the traffic signals SG1, SG2, SG3 and SG4 included in the camera image of the first camera can be integrated with the traffic signals SG1, SG2, SG3 and SG4 included in the camera image of the second camera. By comparing the traffic signal displays between the integrated traffic signals, it can be estimated that, in the example shown in FIG. 11, the traffic signal displays of the traffic signals SG1 and SG2, which each correspond to the forward traffic signal, are blue in color.

FIG. 12 is a conceptual diagram used to describe an example of the traffic-signal-to-traffic-signal relational information according to the present embodiment. In the example shown in FIG. 12, the traffic-signal-to-traffic-signal relational information includes subject target signals for which the traffic-signal-to-traffic-signal relational information is set, related traffic signals having a correlation in the traffic signal display with the subject traffic signals, and the contents of the relationship between the subject traffic signals and the related traffic signals. The subject traffic signals are the traffic signals that the vehicle 1 should follow or will follow, and, for example, the traffic signals located on the running lane of the vehicle 1. The relationship between the subject traffic signal and the related traffic signal can be broadly classified into either one of the two traffic signals facing in the same direction and the two traffic signals facing in a direction in which they intersect with each other. In the example shown in FIG. 12, the former relationship is represented as "Same" and the latter relationship is represented as "Opposite".

In FIG. 12, the relationship between the traffic signals included in the camera image shown in FIG. 9 is represented. When the traffic signal SG1 is the subject traffic signal, the traffic signal having the relationship of "Same" is the traffic signal SG2, and the traffic signal having the relationship of "Opposite" is the traffic signal SG3. As a backup, the traffic signal SG4 may also be registered as another traffic signal having the relationship of "Opposite" with respect to the traffic signal SG1. Similarly, when the traffic signal SG5 is the subject traffic signal, the traffic signal having the relationship of "Same" is the traffic signal SG6, and a traffic signal not listed in the table shown in FIG. 12 but having the relationship of "Opposite" is also registered.

If there is a relationship of any one of "Same" and "Opposite" between traffic signals, the display rule of the traffic signal display between the traffic signals are determined. This display rule is uniquely determined in accordance with traffic laws and regulations. To be more specific, if the relationship is "Same", the traffic signal display of the subject traffic signal coincides with the traffic signal display of the related traffic signal. For example, when the traffic signal display of the subject traffic signal is "red", the traffic signal display of the relationship signal is also "red", and, when the traffic signal display of the subject traffic signal is "blue", the traffic signal display of the related traffic signal is also "blue". Furthermore, when the traffic signal display of the subject traffic signal is a combination of "red" and "blue arrow", the traffic signal display of the related traffic signal is also the combination of "red" and "blue arrow".

If, on the other hand, the relationship is "Opposite", the traffic signal display of the subject traffic signal is basically inconsistent with the traffic signal display of the related traffic signal. For example, when the traffic signal display of the subject traffic signal is "blue" or "yellow", the traffic signal display of the related traffic signal is "red". When the traffic signal display of the subject traffic signal is "red", the traffic signal display of the related traffic signal is "blue". Furthermore, when the traffic signal display of the subject traffic signal is a combination of "red" and "blue arrow", the traffic signal display of the related traffic signal is "red".

7. Traffic Signal Integration Processing

Each of FIGS. 13 to 16 is a conceptual diagram used to describe an example of integration of traffic signals based on the traffic-signal-to-traffic-signal relational information according to the present embodiment. In the example shown in FIG. 13, there are two intersections 1 and 2. The intersection 1 which is closer to the vehicle 1, a traffic signal SG11 is arranged on the left rear side of the intersection 1 when viewed from the vehicle 1, a traffic signal SG12 is arranged on the right front side thereof. Both of these two traffic signals SG11 and SG12 face in a direction parallel to the traveling direction of the vehicle 1, and have the correlation of "Same". In addition, a traffic signal SG17 facing in the traveling direction of the vehicle 1 may also be arranged on the right rear side of the intersection 1, and the traffic signal SG17 has the correction of "Same" with both of the traffic signals SG11 and SG12. Therefore, when, for example, the traffic signal display of the traffic signal SG11 is "red", both of the traffic signal displays of the traffic signals SG12 and SG17 are "red".

Figure 13:
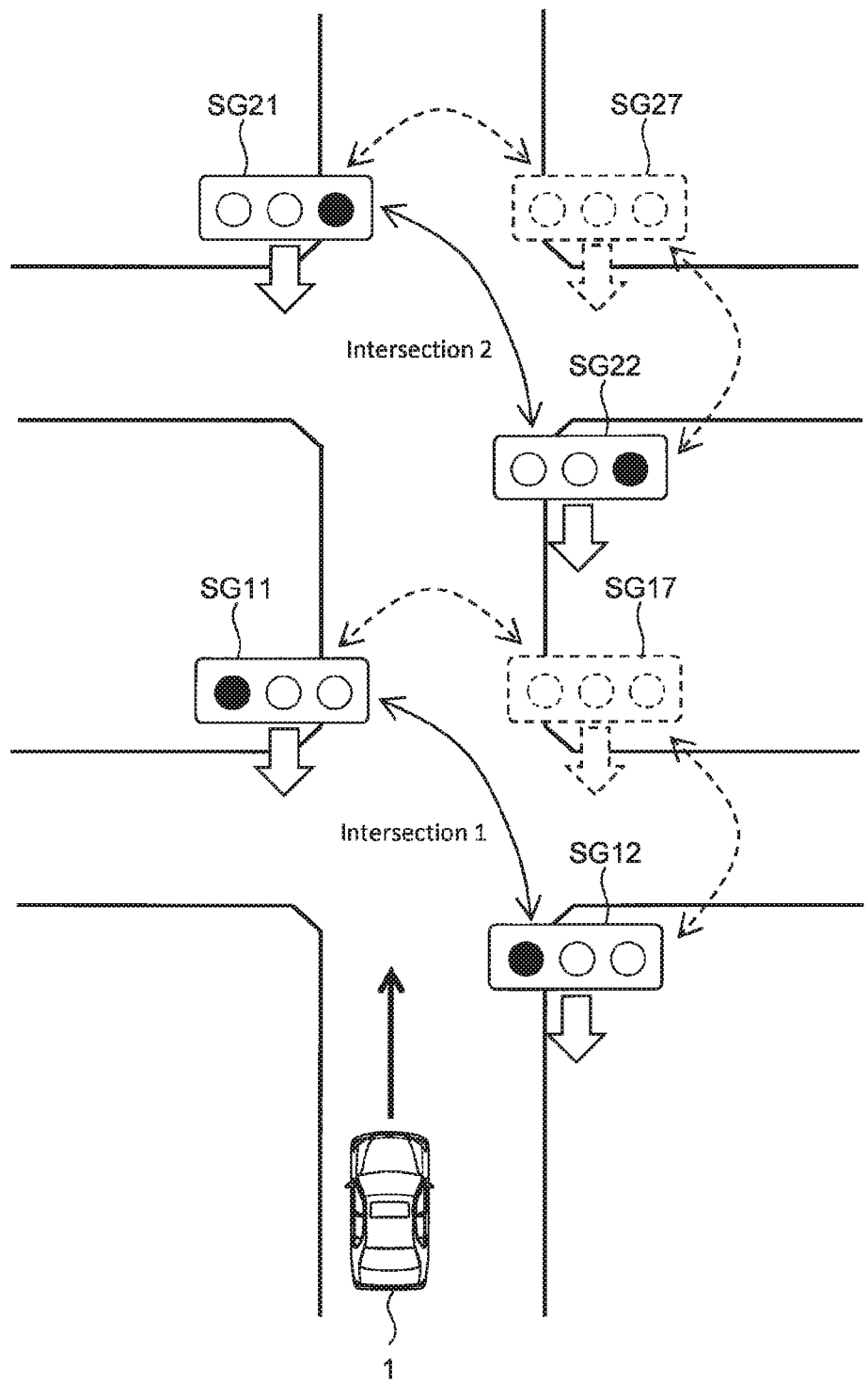
FIG. 13 is a conceptual diagram used to describe an example of integration of traffic signals based on the traffic-signal-to-traffic-signal relational information according to the embodiment of the present disclosure.

The intersection 2 which is farther from the vehicle 1 in FIG. 13, a traffic signal SG21 is arranged on the left rear side of the intersection 2 when viewed from the vehicle 1, a traffic signal SG22 is arranged on the right front side thereof. In addition, a traffic signal SG27 may also be arranged on the right rear side of the intersection 2. Both of these three traffic signals SG21, SG22 and SG27 face in the traveling direction of the vehicle 1, and have the correlation of "Same". However, these traffic signals SG21, SG22 and SG27 are not correlated with the traffic signals SG11, SG12 and SG17 located around the intersection 1. Thus, in the example shown in FIG. 13, the traffic signals SG11, SG12 and SG17 are integrated as one group, and the traffic signals SG21, SG22 and SG27 are integrated as another group.

Figure 14:
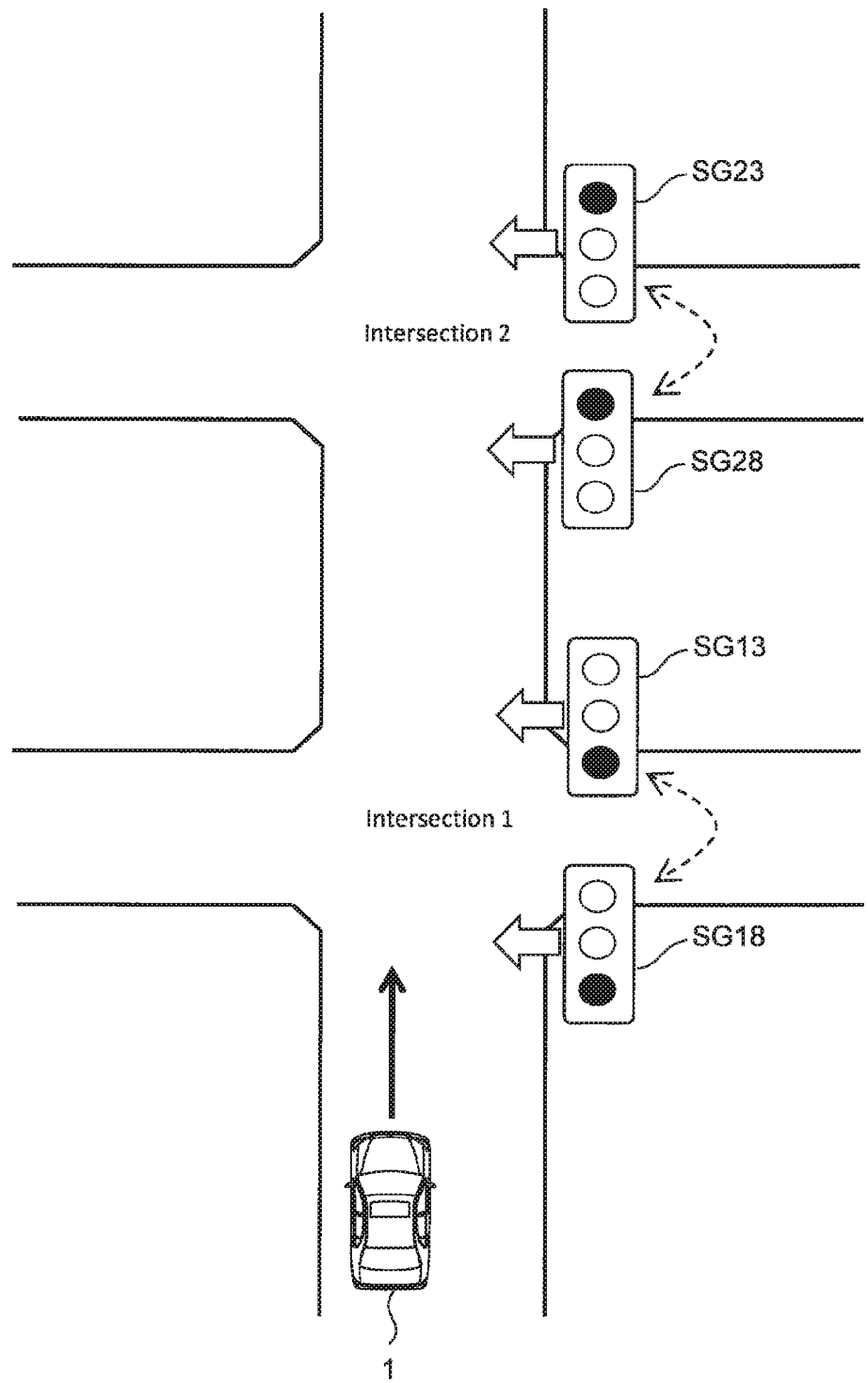
FIG. 14 is a conceptual diagram used to describe another example of the integration of traffic signals based on the traffic-signal-to-traffic-signal relational information according to the embodiment of the present disclosure.

In the example shown in FIG. 14, around the intersection 1, a traffic signal SG13 is arranged on the right rear side of the intersection 1 when viewed from the vehicle 1, and a traffic signal SG18 is arranged on the right front side thereof. Both of these two traffic signals SG13 and SG18 face in a direction intersecting the traveling direction of the vehicle 1, and the two traffic signals SG13 and SG18 thus have the correlation of "Same". Therefore, when, for example, the traffic signal display of the traffic signal SG13 is "blue", the traffic signal display of the traffic signal SG18 is also "blue".

Around the intersection 2 in FIG. 14, a traffic signal SG23 is arranged on the right rear side of the intersection 2 when viewed from the vehicle 1, and a traffic signal SG28 is arranged on the right front side thereof. Both of these two traffic signals SG23 and SG28 face in a direction intersecting the traveling direction of the vehicle 1, and the two traffic signals SG23 and SG28 thus have the correlation of "Same". However, these traffic signal SG23 and SG28 are not correlated with the traffic signals SG13 and SG18 located around the intersection 1. Therefore, in the example shown in FIG. 14, the traffic signals SG13 and SG18 are integrated as one group, and the traffic signals SG23 and SG28 are integrated as another group.

Figure 15:
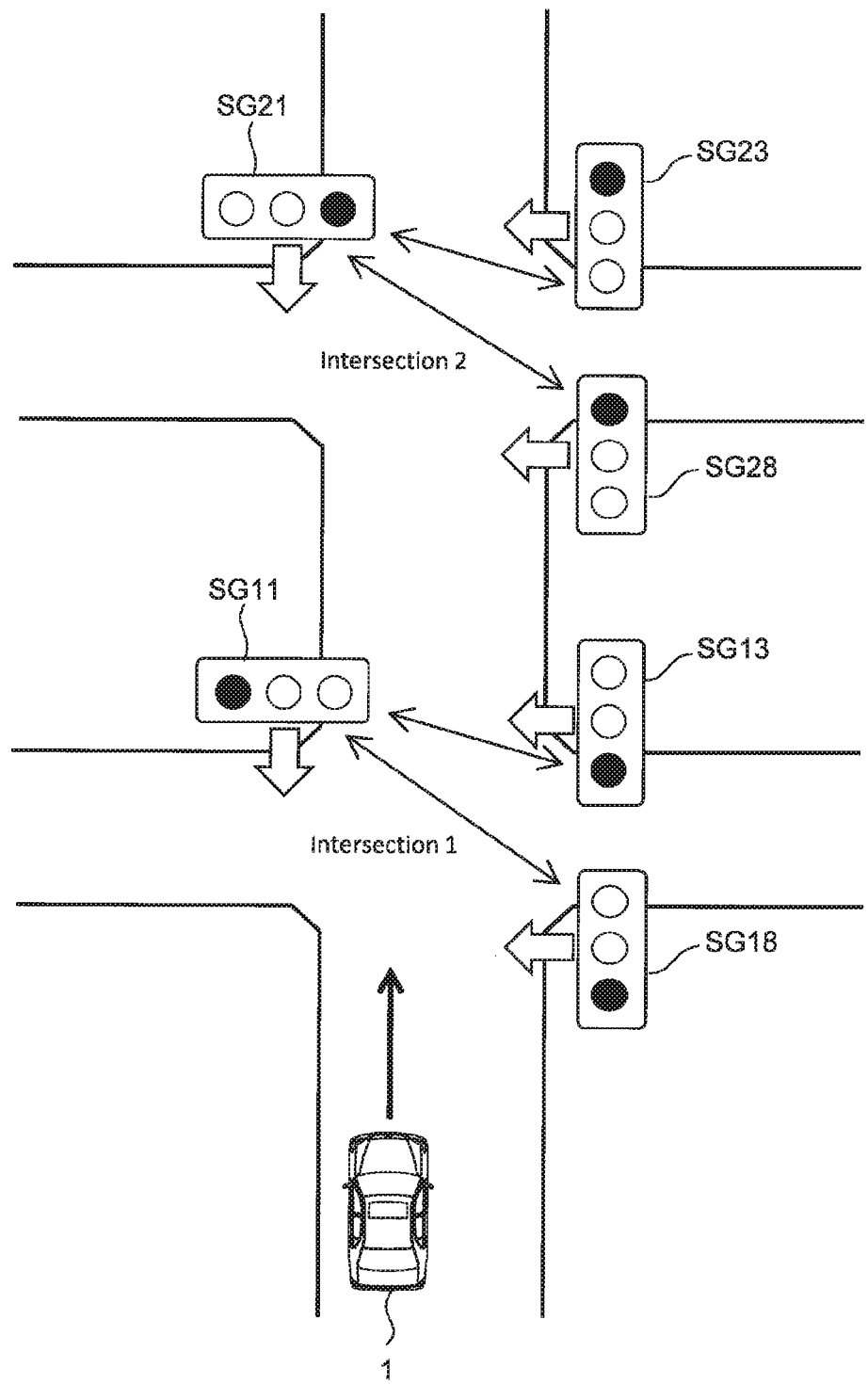
FIG. 15 is a conceptual diagram used to describe still another example of the integration of traffic signals based on the traffic-signal-to-traffic-signal relational information according to the embodiment of the present disclosure.

In the example shown in FIG. 15, around the intersection 1, the traffic signal SG11 is arranged on the left rear side of the intersection 1 when viewed from the vehicle 1, the traffic signal SG13 is arranged on the right rear side thereof, and the traffic signal SG18 is arranged on the right front side thereof. The traffic signal SG13 faces in a direction intersecting with respect to the traffic signal SG11, and the two traffic signals SG11 and SG13 have the correlation of "Opposite". Similarly, the two traffic signals SG11 and SG18 face in a direction intersecting with respect to the traffic signal SG11, and the two traffic signals SG11 and SG18 have the correlation of "Opposite". Therefore, when, for example, the traffic signal display of the traffic signal SG11 is "red", the traffic signal displays of the traffic signals SG13 and SG18 are "blue".

Around the intersection 2 in FIG. 15, the traffic signal SG21 is arranged on the left rear side of the intersection 2 when viewed from the vehicle 1, the traffic signal SG23 is arranged on the right rear side thereof, and the traffic signal SG28 is arranged on the right front side thereof. The traffic signal SG23 has the correlation of "Opposite" with the traffic signal SG21, and the traffic signal SG28 also has the correlation of "Opposite" with the traffic correlation SG21. However, these traffic signals SG21, SG23 and SG28 are not correlated with the traffic signals SG11, SG13 and SG18 located around the intersection 1. Thus, in the example shown in FIG. 15, the traffic signals SG11, SG13 and SG18 are integrated as one group, and the traffic signals SG21, SG23 and SG28 are integrated as another group.

Figure 16:
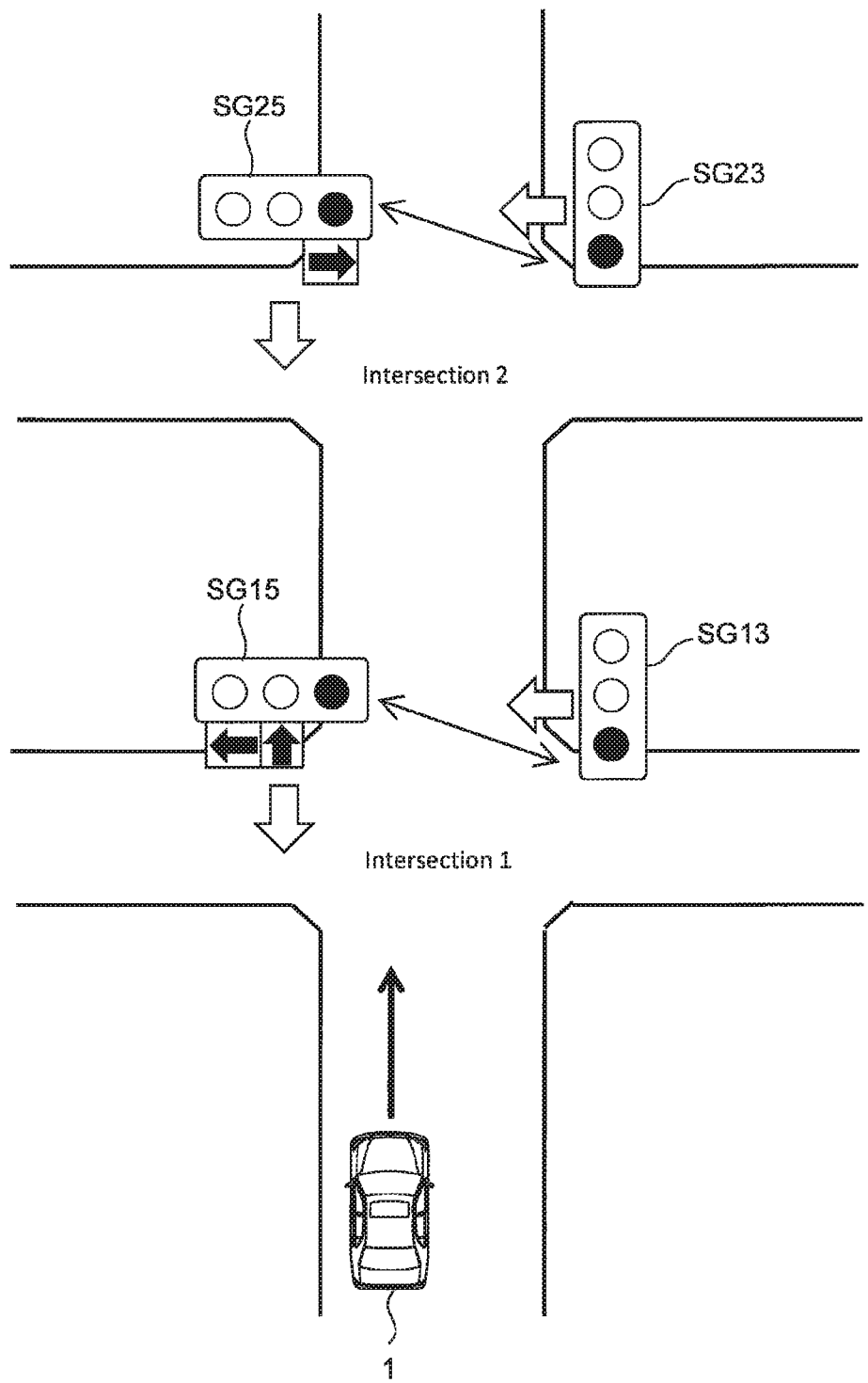
FIG. 16 is a conceptual diagram used to describe yet another example of the integration of traffic signals based on the traffic-signal-to-traffic-signal relational information according to the embodiment of the present disclosure.

In the example shown in FIG. 16, around the intersection 1, a traffic signal SG15 is arranged on the left rear side of the intersection 1 when viewed from the vehicle 1, and the traffic signal SG13 is arranged on the right rear side thereof. The traffic signal SG15 has three colored lights of blue, yellow and red arranged in the upper stage and lights of blue arrows arranged in the lower stage. The lighting of the blue arrow lights means that the vehicle 1 can proceed in the direction of each arrow regardless of the lighting of the red light in the upper stage. Therefore, the traffic signal display of the traffic signal SG15 shown in FIG. 16 means that straight driving and left turn can be performed. The traffic signal SG13 faces a direction intersecting with respect to the traffic signal SG15, and the two traffic signals SG15 and SG13 thus have the correlation of "Opposite". When, for example, the traffic signal display of the traffic signal SG15 is the combination of "red" and "blue arrows", the traffic signal display of the traffic signal SG13 is "red".

Around the intersection 2 in FIG. 16, a traffic signal SG25 is arranged on the left rear side of the intersection 2 when viewed from the vehicle 1, and the traffic signal SG23 is arranged on the right rear side thereof. The traffic signal SG25 has a light of a blue arrow. The traffic signal display of the traffic signal SG25 shown in FIG. 16 means that only a right turn can be performed. The traffic signal SG23 has the correlation of "Opposite" with respect to the traffic signal SG25. However, these traffic signals SG25 and SG23 are not correlated with the traffic signals SG15 and SG13 located around the intersection 1. Therefore, in the example shown in FIG. 16, the traffic signals SG15 and SG13 are integrated as one group, and the traffic signals SG25 and SG23 are integrated as another group.

8. Traffic Signal Display Estimation Processing

The traffic signal display estimation device 40 performs the integration of the traffic signals as described above using the traffic-signal-to-traffic-signal relational information included in the relational database 52. According to this integration, even when the traffic signal display of the forward traffic signal that the vehicle 1 should follow cannot be well identified, the estimation of the traffic signal display of the forward traffic signal can be estimated based on the traffic signal displays of other integrated traffic signals. However, if there is also an inconsistency in identified traffic signal displays of these other traffic signals, there is an issue of which traffic signal display should be believed.

Accordingly, if there is an inconsistency in identified traffic signal displays between the integrated traffic signals, the traffic signal display estimation device 40 estimates the traffic signal display of the forward traffic signal on the basis of an "evaluation value" for each traffic signal. This "evaluation value" is a parameter indicating the certainty of a traffic signal display identified based on the camera image. "Certainty" mentioned here can be replaced with terms "likelihood", "accuracy", "reliability" or "availability". In one example of the estimate based on the evaluation value, the traffic signal display of the forward traffic signal is estimated from the traffic signal display of a traffic signal having the highest evaluation value in accordance with the correlation between the traffic signal having the highest evaluation value and the forward traffic signal.

9. Evaluation Value Calculation Processing

In the image processing using the machine learning used in the traffic signal display identification processing, the probability that the recognized object belongs to each class is calculated. In the evaluation value calculation processing, the evaluation value may be calculated based on the probability obtained in this manner. Where the Bayesian estimation method or the maximum likelihood estimation method is used as a method of the machine learning, the likelihood of the identified traffic signal display can be used as the evaluation value. It should be noted that the evaluation value for a traffic signal is recalculated every time the traffic signal is imaged by the camera and the image processing using the machine learning is performed for the acquired camera image.

Calculation of the evaluation value can be performed using the traffic-signal-to-traffic-signal relational information. When, for example, the relationship of the traffic signal displays identified by the traffic signal display identification processing is consistent with the traffic-signal-to-traffic-signal relational information between two particular traffic signals, the evaluation value of the traffic signal display of each of the two particular traffic signals may be increased with respect to an initial value. The initial value may be a fixed value such as zero, or an evaluation value obtained by the above-mentioned machine learning may be an initial value.

Figure 17:
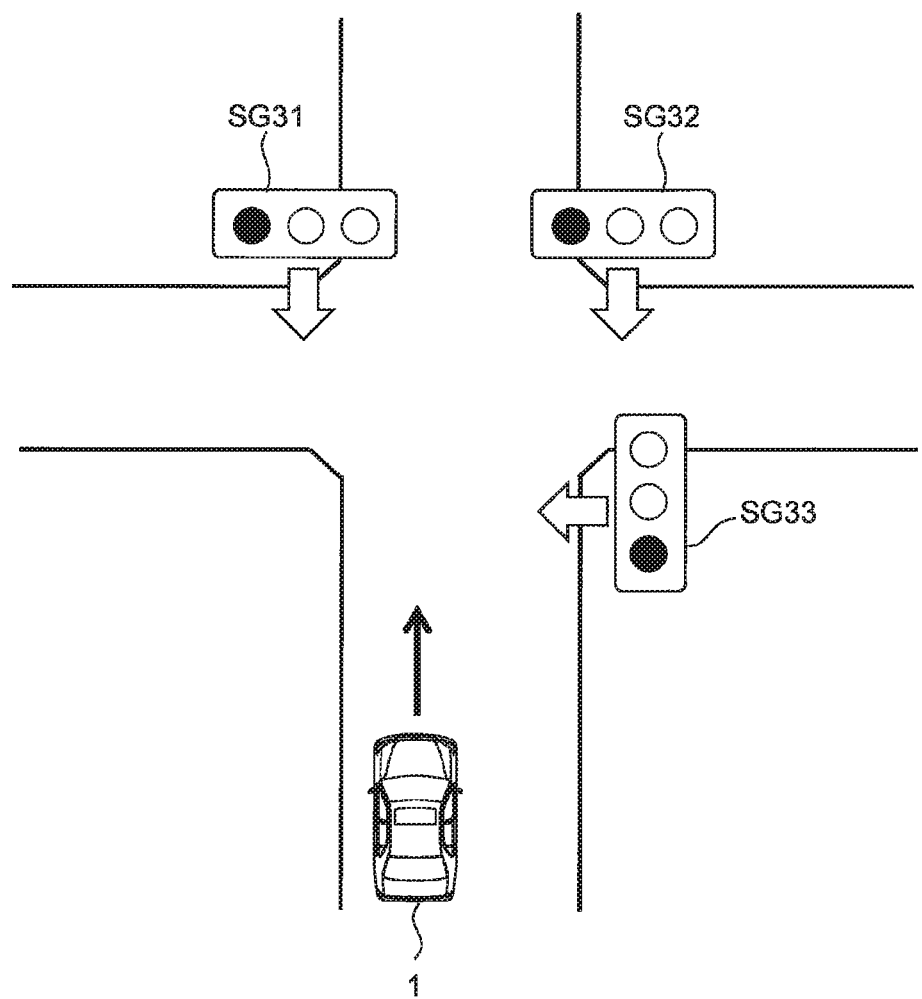
FIG. 17 is a conceptual diagram used to describe an example of first evaluation value calculation processing according to the embodiment of the present disclosure.
Figure 18:
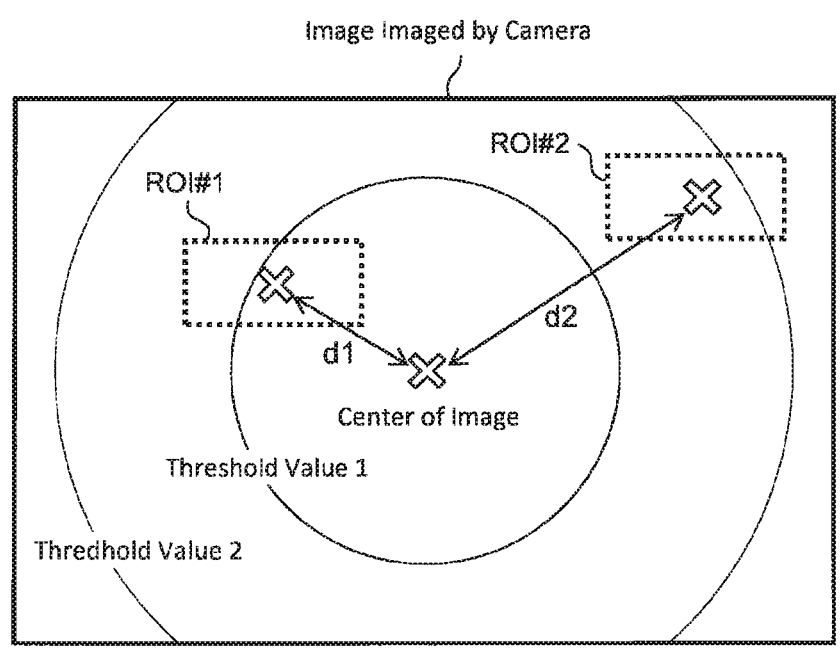
FIG. 18 is a conceptual diagram used to describe another example of the first evaluation value calculation processing according to the embodiment of the present disclosure.

Detailed explanation will be made with reference to FIG. 17. In an example in which both of the traffic signal display of a traffic signal SG31 and the traffic signal display of a traffic signal SG32 are blue colored, the relationship between the identified two traffic signal displays becomes consistent with the traffic-signal-to-traffic-signal relational information because the relationship between the traffic signal SG31 and the traffic signal SG32 is "Same". In this example, each of the evaluation value of the traffic signal display of the traffic signal SG31 and the evaluation value of the traffic signal display of the traffic signal SG32 is increased. Also, in an example in which the traffic signal display of the traffic signal SG31 is blue colored and the traffic signal display of a traffic signal SG33 is red colored, the relationship between the identified two traffic signal displays becomes consistent with the traffic-signal-to-traffic-signal relational information because the relationship between the traffic signal SG31 and the traffic signal SG33 is "Opposite". In this example, each of the evaluation value of the traffic signal display of the traffic signal SG31 and the evaluation value of the traffic signal display of the traffic signal SG33 is increased. As just described, by using the traffic-signal-to-traffic-signal relational information in the evaluation of the certainty of the traffic signal display, it is possible to increase the accuracy of the evaluation value.

The evaluation value can also be calculated from yet other points of view. Hereinafter, examples of the evaluation value calculation processing from other viewpoints will be described with reference to FIGS. 18 to 21. It should be noted that evaluation value calculation processing including the above-described evaluation value calculation processing may be executed independently or may be executed in combination as appropriate. For example, a plurality of evaluation value calculation processings may be executed, and the evaluation value obtained in each processing may be used as an additional value to the initial value. Then, the value obtained by summing all the addition values to the initial value may be used as the final evaluation value.

In the evaluation value calculation processing from the first other point of view, in the camera image a traffic signal near the center of the camera image is made to have a high evaluation value, and, on the other hand, a traffic signal far from the center of the camera image is made to have a low evaluation value. This is because, in a traffic signal located at the end of the camera image, a part of the lights may protrude from the camera image and thus there is the possibility that the traffic signal display cannot be correctly identified only by the remaining part of the lights detected. The positional relationship of the center of the ROI with respect to the center of the camera image represents the relative positional relationship between the camera and the traffic signal in the camera image. By using this relative positional relationship in the evaluation of the certainty of the traffic signal display, it is possible to increase the accuracy of the evaluation value.

In one example according to the first other point of view, the distance from the center of the camera image of the ROI set by the traffic signal recognition processing is calculated, and processing is performed to increase, by a greater amount, the evaluation value of the traffic signal display of a traffic signal in which the distance is shorter. In the concrete example shown in FIG. 18, a circle having the distance of threshold value 1 from the center of the camera image, and an arc having the distance of threshold value 2 (threshold value 2>threshold value 1) from the center of the image are drawn. In addition, two ROIs are set in the camera image. A first ROI #1 is relatively located near the center of the camera image, and a distance d1 from the center of the image is smaller than the threshold value 1. The second ROI #2 is relatively located near an end of the camera image, and a distance d2 from the center of the image is greater than threshold value 1 and smaller than threshold value 2. In this example, a fixed evaluation value A is given to the traffic signal recognized by the ROI #1 in which the distance d1 from the center of the image is smaller than the threshold value 1. Further, a fixed evaluation value B smaller than the evaluation value A is given to the traffic signal recognized by the ROI #2 in which the distance d2 from the center of the image is smaller than the threshold value 2 and greater than or equal to the threshold value 1.

Figure 19:
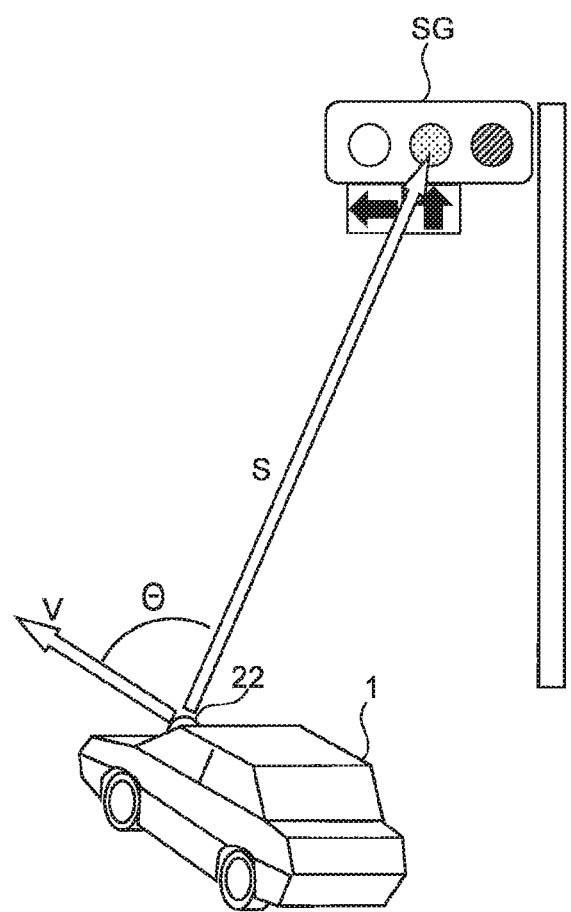
FIG. 19 is a conceptual diagram used to describe still another example of the first evaluation value calculation processing according to the embodiment of the present disclosure.

Moreover, another example according to the first other point of view will be described with reference to FIG. 19. In this example, an angle Θ between a traffic signal vector S and a vehicle vector V is calculated. The traffic indicates the orientation of a traffic signal SG with respect to the camera 22 in the real space. The vehicle vector V indicates the traveling direction of the vehicle 1 in the real space. Then, processing is performed to decrease, by a greater amount, the evaluation value of the traffic signal display of a traffic signal in which the angle Θ between the two vectors S and V is greater. This is because the greater the angle Θ between the vectors S and V is, the closer the distance between the position of the traffic signal SG in the camera image and the end of the camera image becomes. According to this example, by using the relative positional relationship between the camera 22 and the traffic signal SG in the real space in the evaluation of the certainty of the traffic signal display, it is possible to increase the accuracy of the evaluation value.

Next, in the evaluation value calculation processing from the second other point of view, processing is performed to decrease, by a greater amount, the evaluation value of the traffic signal display of a traffic signal in which the degree of obstruction of a traffic signal obstructed by another target object in the camera image is higher. This is because, in this kind of traffic signal, a part of the lights being turned on may be obstructed and the traffic signal display may thus not be correctly identified only by the remaining part of the lights being visible.

Figure 20:
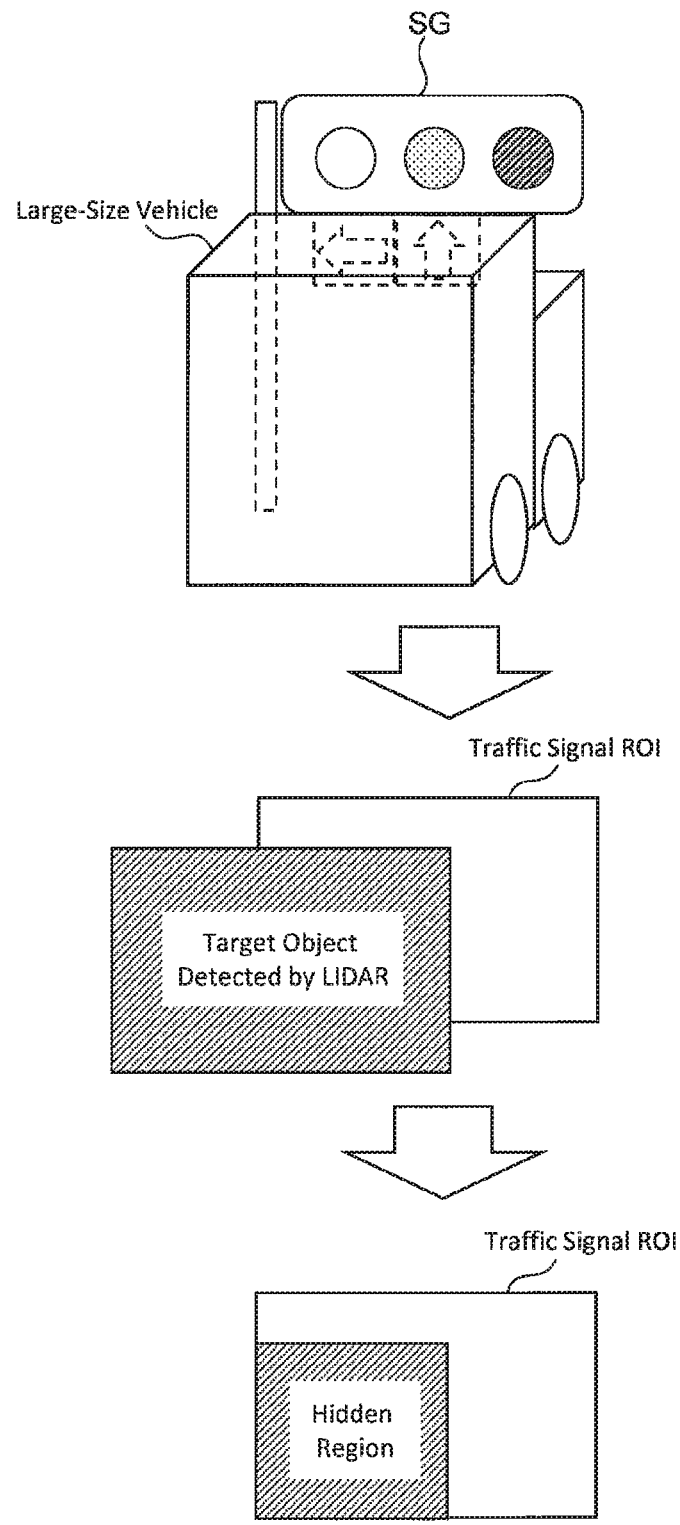
FIG. 20 is a conceptual diagram used to describe yet another example of the first evaluation value calculation processing according to the embodiment of the present disclosure.

Detailed explanation will be made with reference to FIG. 20. In FIG. 20, it is depicted how the lower portion of the traffic signal SG in the real space is obstructed by a large-size vehicle. The obstructed traffic signal SG has three colored lights arranged in the upper stage and has lights of blue arrows indicating the traveling direction arranged in the lower stage. In an example in which the red light in the upper stage and the blue arrow lights in the lower stage are turned on, if only the lights in the lower stage are obstructed, the traffic signal display of this traffic signal SG is identified as "red". The reason why the evaluation value is decreased in accordance with the degree of obstruction of the traffic signal SG is to prevent this kind of erroneous identification results from being reflected in the estimation results of the traffic signal display.

The calculation of the degree of obstruction can be performed by the following procedure. First, the target subject which obstructs the traffic signal is detected by a surrounding situation sensor. The surrounding situation sensor is exemplified by a LIDAR (Laser Imaging Detection and Ranging) and a camera. For example, when a target object is detected by the LIDAR, a bounding box indicating the size of the detected target object is projected into the camera image. Next, a region overlapping with the ROI of the bounding box is calculated as a hidden region. Then, the proportion of the hidden region to the ROI is calculated as the degree of obstruction, and the evaluation value is decreased in accordance with the degree of obstruction. For example, when the degree of obstruction is 40%, the evaluation value is decreased by 40%.

In the evaluation value calculation processing from the third other point of view, processing is performed to correct the evaluation value at the current time point (the current time step) on the basis of the identification results at a past time point (a past time step). That is to say, the evaluation value calculated from the identification result at the current time point is not used as it is, but calculation to correct the evaluation value at the current time point is performed also in consideration of the evaluation value calculated from the identification result at a past time point. By taking into consideration not only the identification results at the current time point but also the identification results at a past time point, the continuity of the identification results of the traffic signal display can be maintained.

In one example from the third other point of view, with respect to a traffic signal in which the traffic signal display is identified in the traffic signal display identification processing at a past time point but the traffic signal display is not identified in the traffic signal display identification processing at the current time point, the evaluation value is not sharply decreased and calculation to correct the evaluation value at the current time point is performed based on the evaluation value at a past time point and the elapsed time from the past time point. According to this example, where the traffic signal display is temporarily not identified due to, for example, an obstruction object, the evaluation value can be prevented from being sharply decreased, and the continuity of the identification results of the traffic signal display can be maintained.

A specific example of the correction calculation of the evaluation value will be described with reference to FIG. 21. In this specific example, the evaluation value of the traffic signal in which the traffic signal display is not identified is made zero. However, if there is an identified record within a maximum of eight seconds, the current evaluation value is calculated in such a manner as to gradually decrease with a lapse of time with, as a reference, the evaluation value in the record. In FIG. 21, white circles indicate evaluation values based on the identification results, and black circles indicate evaluation values corrected and calculated. While no traffic signal display is identified, processing is performed to decrease the evaluation value by a reduction rate of 0.125 per second. In the upper graph of FIG. 21, the traffic signal display had been identified until two seconds ago, and the evaluation value at the current time point is thus corrected and calculated with, as a reference, the evaluation value two seconds ago. In the lower graph of FIG. 21, the traffic signal display had been identified until ten seconds ago, and the evaluation value is thus corrected and calculated until two seconds ago with, as a reference, the evaluation value ten seconds ago. However, the evaluation value at the current time point is made zero as a result of the period of no identification of the traffic signal display exceeding eight seconds.

In another example according to the third other point of view, in a particular traffic signal recognized by the traffic signal recognition processing, when a same traffic signal display is continuously identified in multiple times by the traffic signal display identification processing, processing is performed to increase the evaluation value of the traffic signal display in accordance with the number of consecutive identification times. It can be said that, when a same traffic signal display is identified continuously, the more the number of consecutive identification times is, the higher the reliability of the traffic signal display becomes. Conversely, a traffic signal display having a small number of consecutive identification times has the possibility that the identification results fluctuate due to hunting. Therefore, by increasing the evaluation value of the traffic signal display having a large number of consecutive identification times, even if the plurality of integrated traffic signals include a traffic signal whose identification result of the traffic signal display is fluctuating, hunting of the final estimation result due to the influence of this kind of traffic signal can be prevented.

Figure 22:
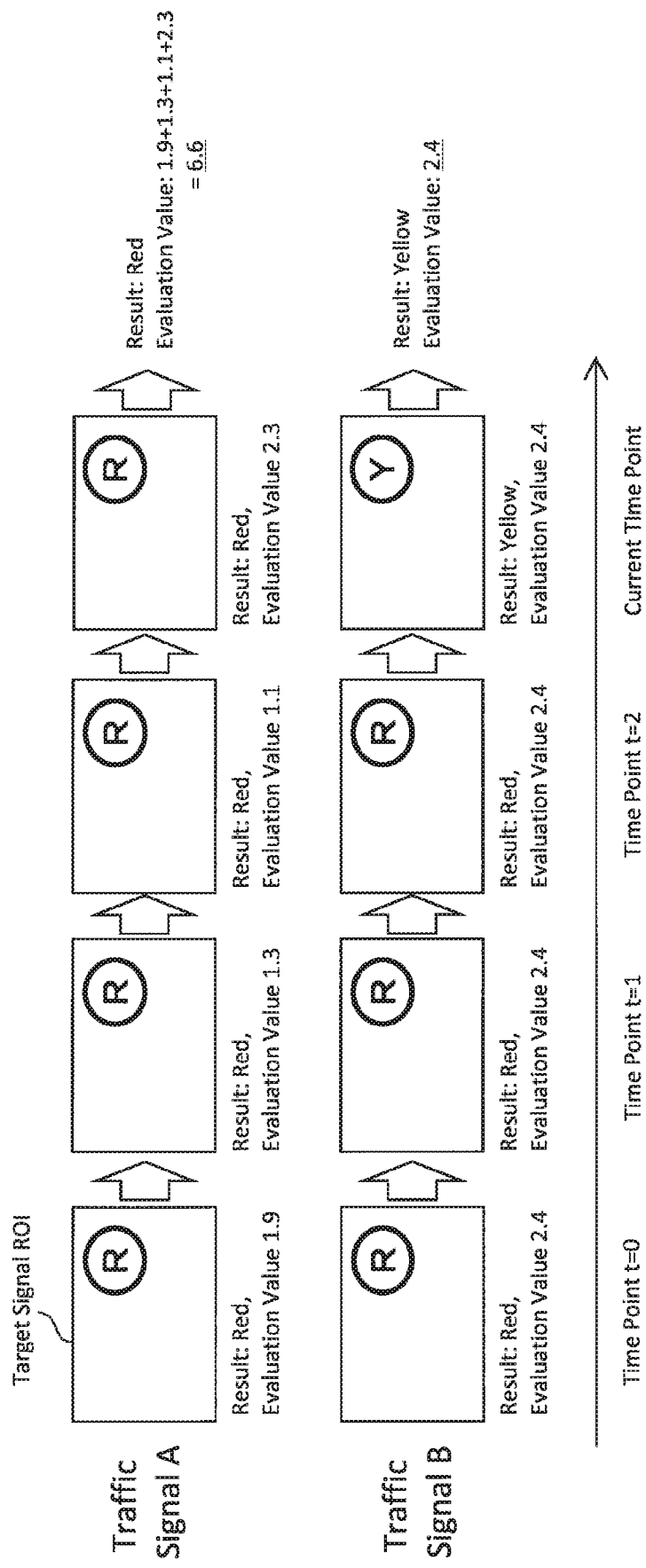
FIG. 22 is a conceptual diagram used to describe yet another example of the first evaluation value calculation processing according to the embodiment of the present disclosure.

The calculation method of the evaluation value in the example described above will be described in detail with reference to FIG. 22. In FIG. 22, the detection position and color of the light in the ROI image associated with each of the traffic signals A and B are depicted for each frame of the camera. The traffic signal A and the traffic signal B are integrated traffic signals. In the traffic signal A, the lighting of the red colored light (indicated by R) is detected at the same position in the ROI images of the past three frames and the frame of the current time point. In other words, in the traffic signal A, "red" as a traffic signal display is identified four times continuously until the current time point. In this specific example, processing is performed to increase the evaluation value by summing the evaluation values for each frame for the number of consecutive times until the current time point. In the example of the traffic signal A, the evaluation values for each frame of four frames until the current time point are summed, and the total value of 6.6 is calculated as the current evaluation value.

In the traffic signal B, the lighting of the red colored light (indicated by R) was detected at the same position in the ROI images of the past three frames, and, on the other hand, the lighting of the yellow colored light (indicated by Y) is detected in the frame of the current time point at the position where the red colored light was detected. In other words, in the traffic signal B, "red" as a traffic signal display was identified three times continuously in the past, while the traffic signal display identified at the current time point is "yellow". Therefore, the number of consecutive identification times concerning the same signal display until the current time point is one, and the evaluation value of 2.4 of the frame at the current time point is calculated as the current evaluation value. As a result, in this specific example, based on the identification results of the traffic signal A having a greater evaluation value, the traffic signal display of the forward traffic signal is estimated.

10. Configuration of Driving Support Control System

Figure 23:
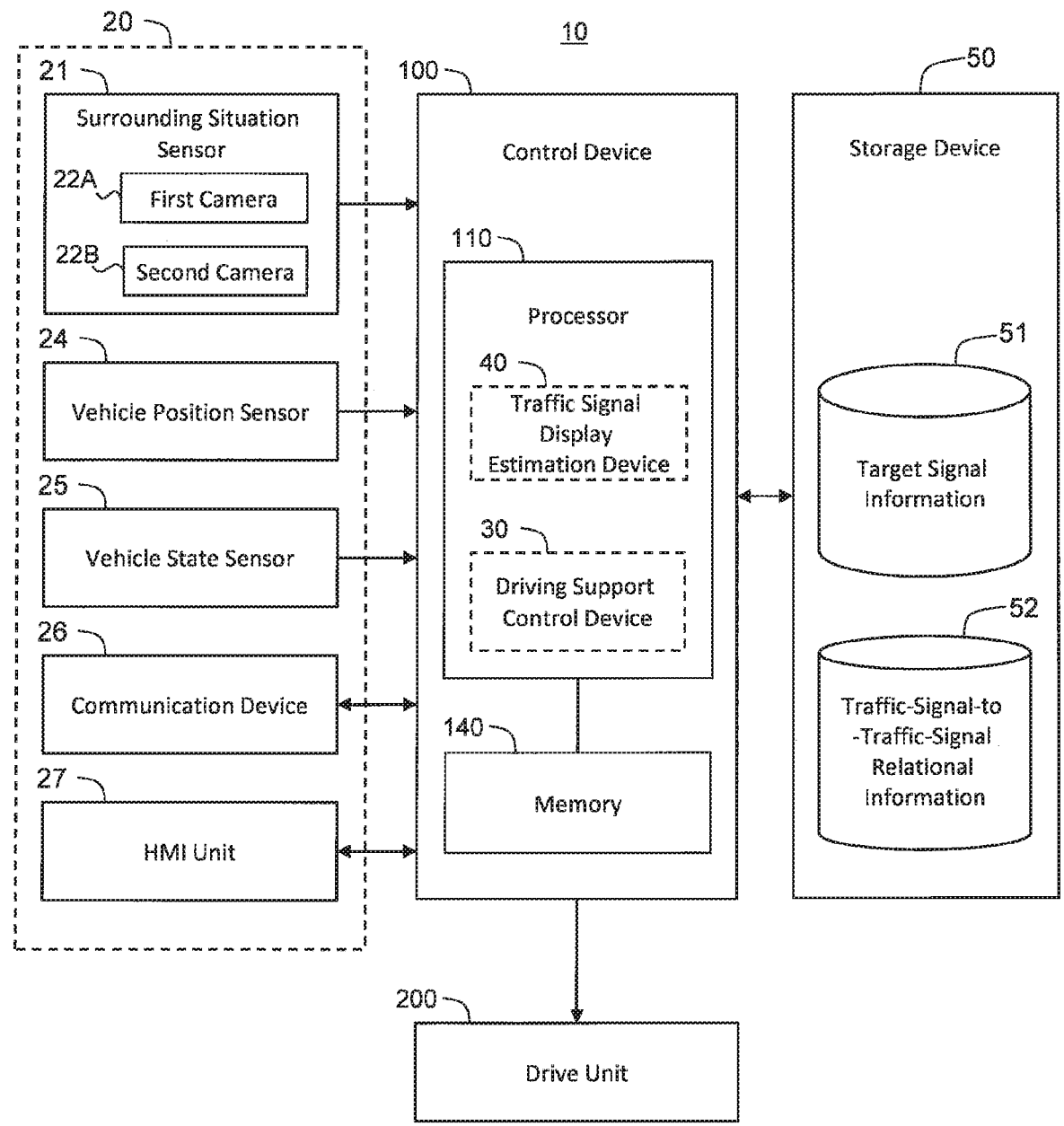
FIG. 23 is a block diagram showing a configuration of the driving support control system according to the present embodiment of the present disclosure.

Next, a detailed configuration of the driving support control system according to the present embodiment will be described with reference to FIG. 23. FIG. 23 is a block diagram showing a configuration of the driving support control system 10 according to the present embodiment. The driving support control system 10 includes the information acquisition device 20, a control device 100, the storage device 50 and a travel device 200.

The information acquisition device 20 includes, for example, a surrounding situation sensor 21, a vehicle position sensor 24, a vehicle state sensor 25, a communication device 26 and an HMI (Human Machine Interface) unit 27. These are electrically connected to the control device 100 directly or via an on-board network (a communication network such as CAN (Controller Area Network) built in the vehicle 1).

The surrounding situation sensor 21 detects a situation around the vehicle 1. The surrounding situation sensor 21 is exemplified by cameras 22A and 22B, a millimeter-wave radar, and an LIDAR. The cameras 22A and 22B each image a scene ahead of the vehicle 1 in the traveling direction. In the configuration shown in FIG. 23, the two cameras 22A and 22B are provided, but the number of cameras may be one or three or more. The LIDAR uses laser beams to detect a target object around the vehicle 1. The millimeter-wave radar uses radio waves to detect a target object around the vehicle 1.

The vehicle position sensor 24 measures the position and orientation of the vehicle 1. For example, the vehicle position sensor 24 includes a GPS receiver. The GPS receiver receives signals transmitted from a plurality of GPS satellites, and calculates the position and orientation of the vehicle 1 on the basis of the received signals.

The vehicle state sensor 25 acquires information about the state of the vehicle 1. The information about the state of vehicle 1 includes, for example, the velocity, acceleration, steering angle and yaw rate of vehicle 1. In addition, the information about the state of the vehicle 1 also includes driving operation by the driver of the vehicle 1. The driving operation includes accelerator operation, brake operation and steering operation.

The communication device 26 performs a communication with the outside of the vehicle 1 (i.e., a V2X communication) to acquire various types of information. For example, the communication device 26 performs a V2N communication with a communication network. The communication device 26 may also perform a V2I communication with the surrounding infrastructure. The communication device 26 may further perform a V2V communication with the surrounding vehicles.

The HMI unit 27 is an interface device for providing information to the driver and receiving information from the driver. More specifically, the HMI unit 27 has an input device and an output device. Examples of the input device include a touch panel, a switch and a microphone. Examples of the output device include a display device and a speaker.

The travel device 200 includes a steering actuator for steering the vehicle 1, a braking actuator for decelerating the vehicle 1, and a drive actuator for accelerating the vehicle 1. A power steering system using an electric motor or hydraulic pressure, and a steer-by-wire steering system correspond to examples of the steering actuator. A hydraulic brake and a power regenerative brake correspond to examples of the braking actuator. An internal combustion engine, an EV system, a hybrid system and a fuel cell system correspond to examples of the drive actuator. These actuators are electrically connected to the control device 100 directly or via the on-board network.

The control device 100 is an ECU (Electronic Control Unit) including a processor 110 and a memory 140. The memory 140 includes a nonvolatile memory in which at least one program (i.e., a program executable by a computer) and data are stored, and a volatile memory in which the calculation results of the processor 110 and information acquired from each sensor are temporarily stored. The program stored in the memory 140 is executed by the processor 110, thereby causing the processor 110 to operate as the driving support control device 30 and also operate as the traffic signal display estimation device 40. It should be noted that the ECU configuring the control device 100 may be a group of a plurality of ECUs.

The storage device 50 includes the traffic signal database 51 and the relational database 52. The storage device 50 is mounted on the vehicle 1, and is electrically connected to the control device 100 directly or via the on-board vehicle network. However, the storage device 50 may alternatively be arranged outside the vehicle 1. For example, the storage device 50 may be located on the Internet and connected to the control device 100 via a wireless communication.

11. Configuration of Traffic Signal Display Estimation System

Figure 24:
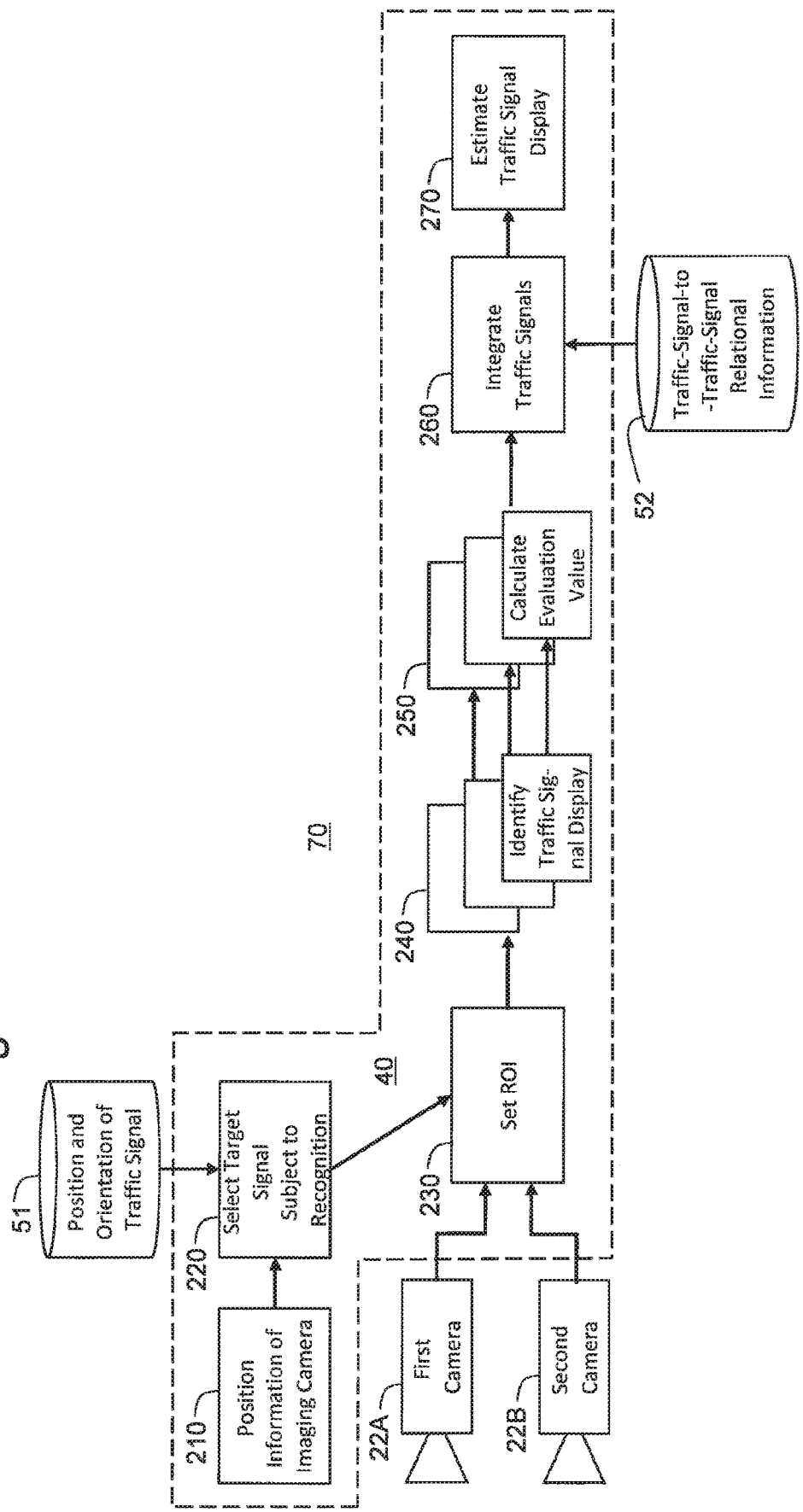
FIG. 24 is a block diagram showing a configuration of a traffic signal display estimation system according to the present embodiment of the present disclosure.

Next, a detailed configuration of the traffic signal display estimation system configuring a part of the driving support control system 10 will be described with reference to FIG. 24. FIG. 24 is a block diagram showing a configuration of a traffic signal display estimation system 70 according to the present embodiment. The traffic signal display estimation system 70 includes the cameras 22A and 22B, the traffic signal display estimation device 40, the traffic signal database 51 and the relational database 52.

The traffic signal display estimation device 40 is one of the functions achieved by the processor 110 (see FIG. 23)

when a predetermined program is executed. The traffic signal display estimation device 40 may be further divided into a plurality of functions. Each of the functions of the traffic signal display estimation device 40 is represented as a position information acquisition unit 210, a recognition target selection unit 220, an ROI setting unit 230, a traffic signal display identification unit 240, an evaluation value calculation unit 250, a traffic signal integration unit 260 and a traffic signal display estimation unit 270.

The position information acquisition unit 210 acquires the position information of the cameras 22A and 22B. The position information is concerning the absolute position of each of the cameras 22A and 22B in the three-dimensional space, which is equal to the position information of the vehicle 1 acquired from the GPS receiver.

The recognition target selection unit 220 performs preprocessing of the traffic signal recognition processing. Into the recognition target selection unit 220, the traffic signal information of the traffic signal database 51, the position information of the cameras 22A and 22B acquired by the position information acquisition unit 210 are imported. As the preprocessing, the recognition target selection unit 220 narrows down one or more traffic signals subject to the traffic signal recognition processing from among the traffic signals registered in the traffic signal database 51, based on the relationship between the position of each of the cameras 22A and 22B and the position and orientation of each traffic signal.

The ROI setting unit 230 sets an ROI indicating a region in which the one or more traffic signals subject to the recognition selected by the recognition target selection unit 220 are present, with respect to the camera image imaged by each of the cameras 22A and 22B. When a plurality of traffic signals are selected as the target of the recognition, a plurality of ROIs associated with the plurality of traffic signals are set in the camera image. By setting the ROI to the camera image of each of the cameras 22A and 22B, one or more traffic signals included in the camera image of each of the cameras 22A and 22B are recognized.

The traffic signal display identification unit 240 cuts out, from the camera image, each ROI set by the ROI setting unit 230, and executes the image processing using the machine learning to detect a light turned on in the cut out ROI image. Then, the traffic signal display identification unit 240 calculates the position of the light turned on in the ROI image, and identifies the traffic signal display of the traffic signal for each ROI image (i.e., for each traffic signal) from the color and position of the light turned on.

The evaluation value calculation unit 250 executes the evaluation value calculation processing described above, and calculates the evaluation value of the traffic signal display identified for each traffic signal by the traffic signal display identification unit 240. According to the evaluation value calculation unit 250, the traffic signal display and the evaluation value thereof are obtained for each traffic signal included in the camera image of each of the cameras 22A and 22B.

The traffic signal integration unit 260 integrates the forward traffic signal that is ahead of the traveling direction and that the vehicle 1 should follow and one or more traffic signals having the correlation in traffic signal display with the forward traffic signal, among a plurality of traffic signals recognized by the traffic signal recognition processing. In this integration processing, the traffic signal integration unit 260 refers to the traffic-signal-to-traffic-signal relational information included in the relational database 52.

The traffic signal display estimation unit 270 judges, based on the traffic-signal-to-traffic-signal relational information, whether there is an inconsistency in the traffic signal display identified by the traffic signal display identification unit 240 between a plurality of signals integrated by the traffic signal integration unit 260. For example, if the traffic signal display differs between the traffic signals having the relationship of "Same", or if the traffic signal display is the same between the traffic signals having the relationship of "Opposite", it can be determined that there is an inconsistency in the traffic signal display. When this kind of inconsistency is not generated, the traffic signal display estimation unit 270 estimates, as the actual signal display, the traffic signal display of the forward traffic signal identified by the traffic signal display identification unit 240. When, on the other hand, this kind of inconsistency is generated, the traffic signal display estimation unit 270 estimates the traffic signal display of the forward traffic signal on the basis of the evaluation value for each traffic signal calculated by the evaluation value calculation unit 250. More specifically, for example, the traffic signal display of the forward traffic signal is estimated based on an assumption that the traffic signal display of a traffic signal having the highest evaluation value is correct.

12. Flow of Processing in Traffic Signal Display Estimation System

Figure 25:
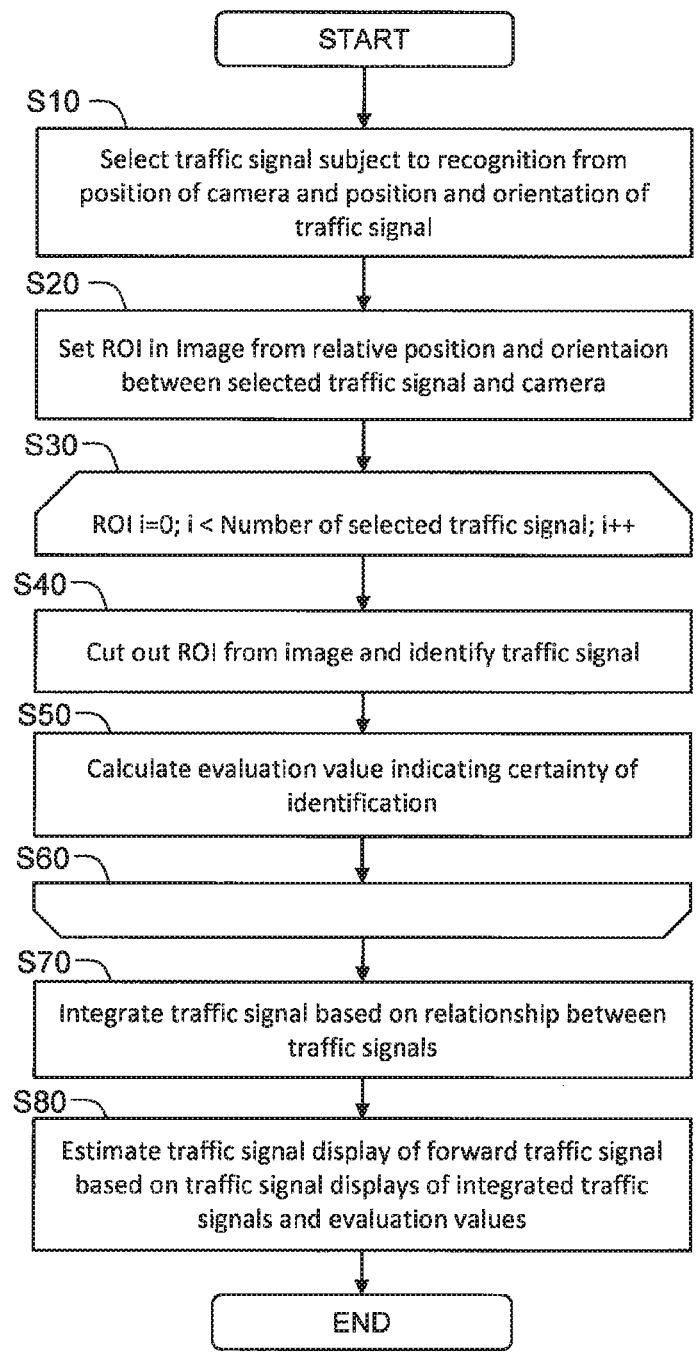
FIG. 25 is a flowchart showing a flow of processing in the traffic signal display estimation system according to the embodiment of the present disclosure.

Next, the flow of the processing in the traffic signal display estimation system 70 according to the present embodiment will be described. FIG. 25 is a flowchart showing the flow of the processing in the traffic signal display estimation system 70 according to the present embodiment, in particular, the flow of the processing by the traffic signal display estimation device 40.

In step S10, the traffic signal display estimation device 40 selects one or more traffic signals subject to the recognition from the position of the camera and the position and orientation of each traffic signal. In this processing, the traffic signal display estimation device 40 uses the traffic signal information in which the position and orientation of each traffic signal in the three-dimensional space are registered.

In step S20, the traffic signal display estimation device 40 sets an ROI in the camera image imaged by the camera from the relative position and orientation between the camera and each traffic signal selected in step S10.

In step S30, the traffic signal display estimation device 40 determines whether or not the number i of ROIs for which the following steps S40 and S50 have been executed is smaller than the number of traffic signals selected in step S10. If the determination result is positive, the traffic signal display estimation device 40 increases the value of i by one and also executes steps S40 and S50.

In step S40, the traffic signal display estimation device 40 selects an ROI for which this step has not yet been performed from among the ROIs set in step S20. Then, the traffic signal display estimation device 40 cuts out the selected ROI from the camera image and executes the image processing using the machine learning to detect a light turned on in the cut out ROI. The traffic signal display estimation device 40 calculates the position of the light during lighting in the ROI image and identifies the traffic signal display of the traffic signal from the color and position of the light during lighting.

In step S50, the traffic signal display estimation device 40 calculates an evaluation value of the traffic signal display identified in step S40.

In step S60, the traffic signal display estimation device 40 determines whether or not the number i of ROIs for which steps S40 and S50 have been performed is equal to or greater than the number of traffic signals selected in step S10. If the determination result is negative, the traffic signal display estimation device 40 returns to step S30. If, on the other hand, if the determination result is positive, the traffic signal display estimation device 40 then executes steps S70 and S80.

In step S70, the traffic signal display estimation device 40 integrates the forward traffic signal that is ahead of the traveling direction and that the vehicle 1 should follow and a traffic signal having the correlation in traffic signal display with the forward traffic signal. In this processing, the traffic signal display estimation device 40 uses the traffic-signal-to-traffic-signal relational information indicating the relationship of the traffic signal display between the traffic signals.

In step S80, the traffic signal display estimation device 40 estimates the traffic signal display of the forward traffic signal that is ahead of the traveling direction and that the vehicle 1 should follow, on the basis of the traffic signal display and the evaluation value of each of the integrated traffic signals.

Figure 26:
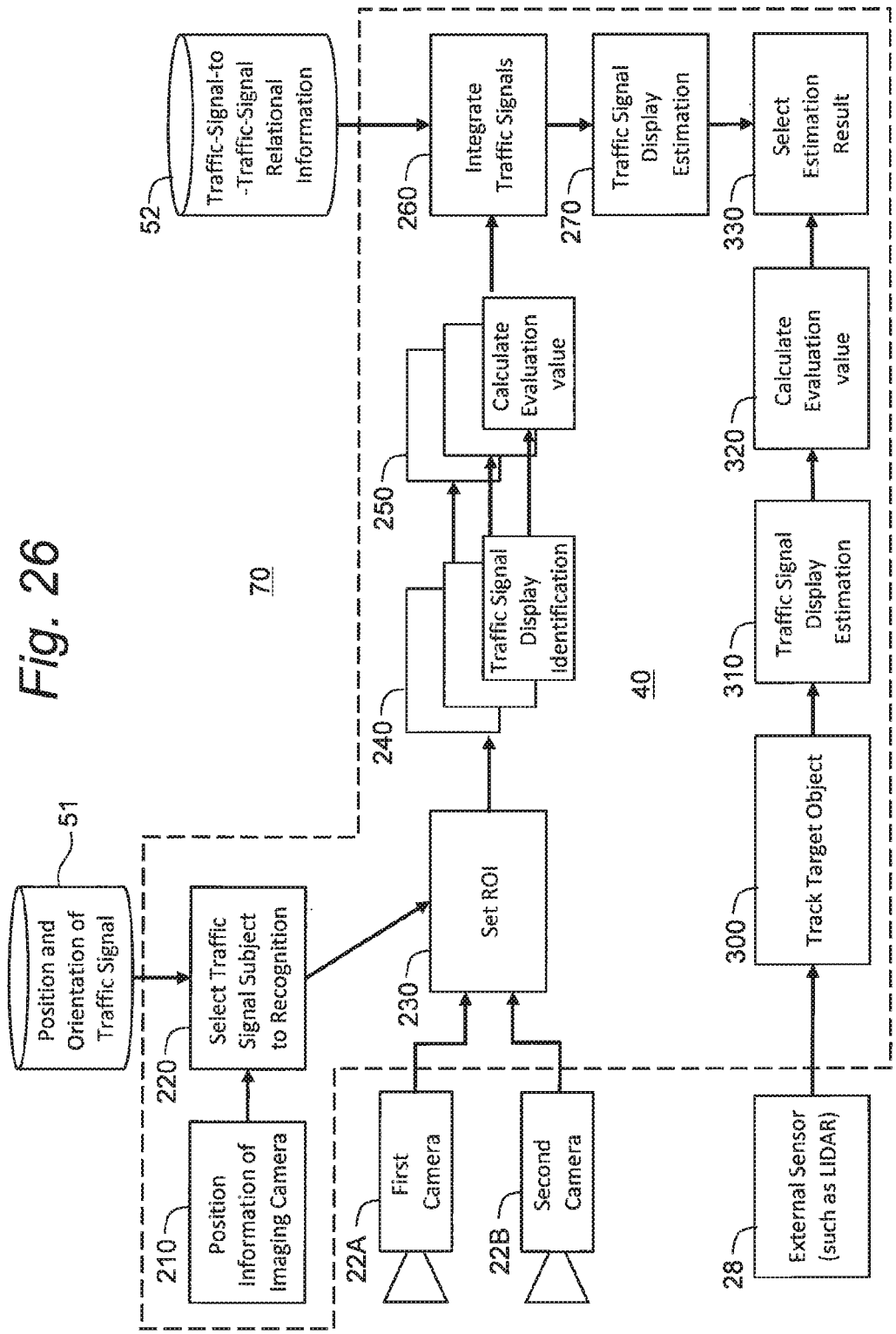
FIG. 26 is a block diagram showing a configuration of a modification example of the traffic signal display estimation system according to the present embodiment of the present disclosure.

13. Configuration of Modification Example of Traffic Signal Display Estimation System Next, a modification example of the traffic signal display estimation system will be described with reference to FIG. 26. FIG. 26 is a block diagram showing a configuration of the modification example of the traffic signal display estimation system 70 according to the present embodiment. In this modification example, the traffic signal display estimation system 70 includes the cameras 22A and 22B, an external sensor 28, the traffic signal display estimation device 40, the traffic signal database 51 and the relational database 52. The external sensor 28 is configured to detect a target object around the vehicle 1, and is exemplified by a LIDAR or a millimeter-wave radar.

In this modification example, the traffic signal display estimation device 40 has functions as a target object tracking unit 300, a traffic signal display estimation unit 310, an evaluation value calculation unit 320 and an estimation result selection unit 330, in addition to the functions of the position information acquisition unit 210, the recognition target selection unit 220, the ROI setting unit 230, the traffic signal display identification unit 240, the evaluation value calculation unit 250, the traffic signal integration unit 260 and the traffic signal display estimation unit 270. That is to say, in this modification example, the programs stored in the memory 140 of the control device 100 is configured, when executed by the processor 110, to cause the processor 110 to further operate as the target object tracking unit 300, the traffic signal display estimation unit 310, the evaluation value calculation unit 320 and the estimation result selection unit 330.

In the following, the target object tracking unit 300, the traffic signal display estimation unit 310, the evaluation value calculation unit 320 and the estimation result selection unit 330 that are characteristic portions in the modification example will be described.

The target object tracking unit 300 tracks a target object detected by the external sensor 28. The target object tracked by the target object tracking unit 300 is a vehicle traveling around the vehicle 1 and is not limited to one vehicle. For example, in the vicinity of an intersection, a preceding vehicle traveling ahead of the vehicle 1 corresponds to a target object of the tracking, and an intersecting vehicle traveling at the intersection in a direction intersecting the traveling direction of the vehicle 1 also corresponds to a target object of the tracking. The target object tracking unit 300 estimates the absolute position of the target object on the map on the basis of the relative distance of the target object with respect to the vehicle, and also estimates the velocity of the target object from a change in the position of the target object.

The traffic signal display estimation unit 310 determines the behavior of the tracked target object from the position and velocity of the tracked target object estimated by the target object tracking unit 300, and estimates, from the behavior of the tracked target object, the traffic signal display of the forward traffic signal that is ahead of the traveling direction and that the vehicle 1 should follow. Since this kind of target object around the vehicle 1 is also driven in accordance with the traffic signals similarly to the vehicle 1, the traffic signal display of the forward traffic signal can be estimated from the behavior of the target object. For example, if the preceding vehicle, which is a tracked target object, has passed through the intersection, the traffic signal display of the forward traffic signal can be estimated to be blue. Also, if the intersection vehicle, which is a tracked target object, has passed through the intersection, the traffic signal display of the forward traffic signal can be estimated to be red. It should be noted that the traffic signal display estimation unit 310 is positioned as a "second traffic signal display estimation unit" with respect to the traffic signal display estimation unit 270 positioned as a "first traffic signal display estimation unit".

The evaluation value calculation unit 320 calculates an "evaluation value (second evaluation value)" indicating the likelihood of the traffic signal display (second estimated traffic signal display) of the forward traffic signal estimated (determined) by the traffic signal display estimation unit 310. The "evaluation value (first evaluation value)" calculated by the evaluation value calculation unit 250 is a parameter indicating the certainty of the traffic signal display identified based on the camera image, and, on the other hand, the "evaluation value (second evaluation value)" calculated by the evaluation value calculation unit 320 is a parameter indicating the likelihood (certainty) of the traffic signal display estimated from the behavior of the target object. For example, the tracking reliability of a target object used as a base for the estimation of the traffic signal display, or the variance of the position or velocity of this target object can be used as the "evaluation value (second evaluation value)". It should be noted that the evaluation value calculation unit 320 is positioned as the second evaluation value calculation unit with respect to the evaluation value calculation unit 250 positioned as a "first evaluation value calculation unit".

The estimation result selection unit 330 compares the evaluation value (hereinafter, referred to as an "evaluation value A") associated with the traffic signal display (first estimated traffic signal display) estimated by the traffic signal display estimation unit 270, with the evaluation value (hereinafter, referred to as an "evaluation value B") calculated by the evaluation value calculation unit 320. When the evaluation value A is higher than the evaluation value B, the estimation result selection unit 330 selects the traffic signal display (first estimated traffic signal display) estimated by the traffic signal display estimation unit 270 as the final estimation result. When, on the other hand, the evaluation value A is equal to or less than the evaluation value B, the estimation result selection unit 330 selects the traffic signal display (second estimated traffic signal display) estimated by the traffic signal display estimation unit 310 as the final estimation result.

Figure 27:
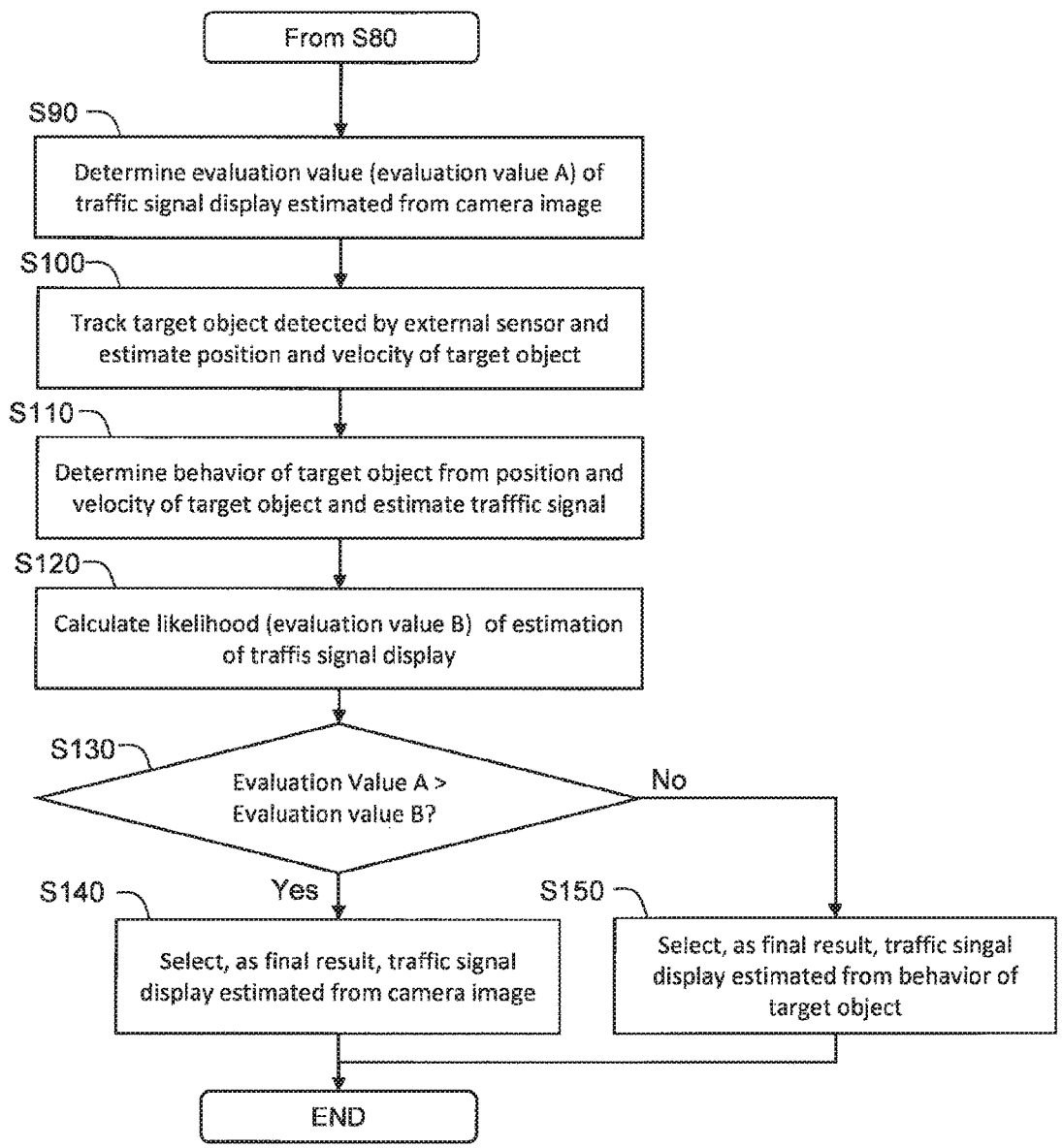
FIG. 27 is a flowchart showing a flow of processing in the modification example of the traffic signal display estimation system according to the embodiment of the present disclosure.

14. Flow of Processing in Modification Example of Traffic Signal Display Estimation System Next, the flow of the processing in the modification example of the traffic signal display estimation system 70 according to the present embodiment will be described. FIG. 27 is a flowchart showing the flow of the processing in the modification example of the traffic signal display estimation system 70 according to the present embodiment (in particular, the flow of the processing by the traffic signal display estimation device 40 according to the modification example). However, in the flowchart, only the processing of step S80 and thereafter is shown.

In step S90, the traffic signal display estimation device 40 determines the evaluation value (evaluation value A) of the traffic signal display (first estimated traffic signal display) estimated in step S80. For example, if the traffic signal display of the forward traffic signal is estimated based on the traffic signal display of a traffic signal having the highest evaluation value among the integrated traffic signals, the highest evaluation value is determined as the evaluation value A.

In step S100, the traffic signal display estimation device 40 tracks a target object detected by the external sensor 28 and estimates the position and velocity of the target object.

In a stepping S110, the traffic signal display estimation device 40 determines the behavior of the target object from the position and velocity of the target object and then estimates a traffic signal display (second estimated traffic signal display) of the forward traffic signal based on the behavior of the target object. This processing is referred to as a "second traffic signal display estimation processing".

In step S120, the traffic signal display estimation device 40 calculates an evaluation value (evaluation value B) indicating the likelihood of the traffic signal display (second estimated traffic signal display) of the forward traffic signal estimated by the second traffic signal display estimation processing. This processing is referred to as a "second evaluation value calculation processing".

In step S130, the traffic signal display estimation device 40 compares the evaluation value A with the evaluation value B. When the evaluation value A is higher than the evaluation value B, the traffic signal display estimation device 40 selects step S140 and selects, as the final estimation result, the traffic signal display (first estimated traffic signal display) estimated from the camera image. When, on the other hand, the evaluation value A is equal to or less than the evaluation value B, the traffic signal display estimation device 40 selects step S150 and selects, as the final estimation result, the traffic signal display (second estimated traffic signal display) estimated from the behavior of the target object. These pieces of processing are referred to as an "estimation result selection processing".

By executing the processing from step S90 through S150 in addition to the processing until step S80, even when the estimation accuracy of the traffic signal display based on the camera image cannot be ensured, the traffic signal display of the forward traffic signal that is ahead of the traveling direction and that the vehicle 1 should follow can be estimated based on the behavior of the surrounding vehicle.

15. Others

Figure 28:
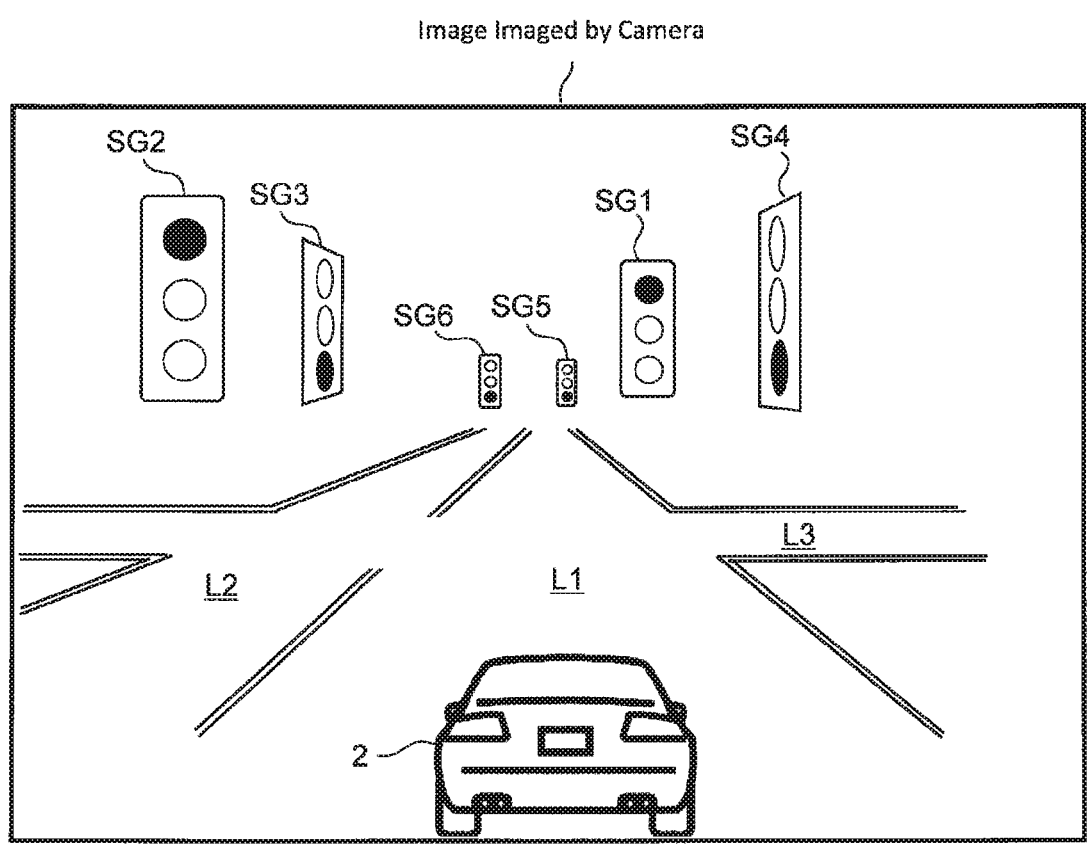
FIG. 28 is a conceptual diagram used to describe yet another example of the camera image including a plurality of traffic signals according to the embodiment of the present disclosure.

In the embodiments described above, the explanation has been made by referring to the examples of camera images which are acquired in a country or a region where the vehicle 1 runs on the left side of the road and traffic signals having lights arranged horizontally in a row are used. However, the applicability of the traffic signal display estimation system according to the present disclosure does not depend on the traffic laws and regulations. For example, the traffic signal display estimation system according to the present disclosure may be applicable to a country or a region where the vehicle 1 runs on the right side of the road and traffic signals having lights arranged vertically in a row are used, as shown in FIG. 28.

What is claimed is:

1. A traffic signal display estimation system comprising:
   one or more cameras mounted on a vehicle to image a scene ahead of the vehicle in a traveling direction thereof;
   a computer linked to the one or more cameras; and
   a storage device coupled to the computer,
   wherein the storage device includes:
   a traffic signal database including a traffic signal information that indicates a position and orientation of a traffic signal; and
   a relational database including a traffic-signal-to-traffic-signal relational information that indicates a relationship of traffic signal display between a plurality of traffic signals, and
   wherein the computer is configured to:
   execute a traffic signal recognition processing to recognize, based on a position information of the vehicle and the traffic signal information, a traffic signal included in a camera image imaged by the one or more cameras;
   execute a traffic signal display identification processing to identify a traffic signal display for each traffic signal recognized by the traffic signal recognition processing;
   execute a first evaluation value calculation processing to calculate, for each traffic signal, a first evaluation value indicating a certainty of the traffic signal display identified by the traffic signal recognition processing;
   execute a traffic signal integration processing to integrate, based on the traffic-signal-to-traffic-signal relational information, a forward traffic signal that is ahead of the travelling direction and that the vehicle should follow and a traffic signal correlated with the forward traffic signal in terms of the traffic signal display, among a plurality of traffic signals recognized by the traffic signal recognition processing; and
   when there is an inconsistency in traffic signal displays identified by the traffic signal display identification processing between a plurality of traffic signals integrated in the traffic signal integration processing, execute a first traffic signal display estimation processing to determine a first estimated traffic signal display of the forward traffic signal, based on a traffic signal display of a traffic signal highest in the first evaluation value calculated by the first evaluation calculation processing, wherein the traffic signal recognition processing includes processing to calculate a degree of confrontation of each traffic signal with respect to the one or more cameras using the position information of the vehicle and the traffic signal information and recognize, in the camera image, a traffic signal having the degree of confrontation higher than or equal to a threshold value.

2. The traffic signal display estimation system according to claim 1,
   wherein the traffic signal recognition processing includes processing to select a traffic signal located within a specified distance from the one or more cameras using the position information of the vehicle and the traffic signal information and recognize the selected traffic signal in the camera image.

3. The traffic signal display estimation system according to claim 1,
wherein the traffic signal recognition processing includes processing to select a traffic signal located within an angle of view of the one or more cameras using the position information of the vehicle and the traffic signal information and recognize the selected traffic signal in the camera image.

4. The traffic signal display estimation system according to claim 1,
wherein the traffic signal recognition processing includes processing to calculate an elevation angle of each traffic signal with respect to the one or more cameras using the position information of the vehicle and the traffic signal information, calculate an altitude of sun using the position of the vehicle and time, and recognize, in the camera image, a traffic signal having an elevation angle smaller than or equal to an elevation angle threshold value determined from the altitude of the sun.

5. The traffic signal display estimation system according to claim 1,
wherein, the first evaluation value calculation processing includes processing to increase each of the first evaluation values of traffic signal displays of two particular traffic signals recognized by the traffic signal recognition processing when a relationship of traffic signal displays identified by the traffic signal display identification processing is consistent, between the two particular traffic signals, with the traffic-signal-to-traffic-signal relational information.

6. The traffic signal display estimation system according to claim 1,
wherein the first evaluation value calculation processing includes processing to calculate a distance from a center of the camera image of each of traffic signals recognized by the traffic signal recognition processing and increase, by a greater amount, the first evaluation value of the traffic signal display of a traffic signal in which the distance is shorter.

7. The traffic signal display estimation system according to claim 1,
wherein the first evaluation value calculation processing includes processing to calculate, using the position information of the vehicle and the traffic signal information, a traffic signal vector indicating an orientation of each of traffic signals recognized by the traffic signal recognition processing with respect to the one or more cameras in a real space and decrease, by a greater amount, the first evaluation value of the traffic signal display of a traffic signal in which an angle between a vehicle vector indicating the traveling direction of the vehicle in the real space and the traffic signal vector is greater.

8. The traffic signal display estimation system according to claim 1,
wherein the first evaluation value calculation processing includes processing to calculate a degree of obstruction of each of traffic signals recognized by the traffic signal recognition processing and obstructed by another target object and decrease, by a greater amount, the first evaluation value of the traffic signal display of a traffic signal in which the degree of obstruction is higher.

9. The traffic signal display estimation system according to claim 1,
wherein, with respect to a traffic signal in which the traffic signal display is identified in the traffic signal display identification processing executed at a past time point but the traffic signal display is not identified in the traffic signal display identification processing executed at a current time point, the first evaluation value calculation processing includes processing to calculate the first evaluation value at the current time point based on the first evaluation value at the past time point and an elapsed time from the past time point.

10. The traffic signal display estimation system according to claim 1,
wherein, with respect to a particular traffic signal recognized in the traffic signal recognition processing, the first evaluation value calculation processing includes processing to increase the first evaluation value of the traffic signal display of the particular traffic signal in accordance with number of consecutive identification times of a same traffic signal display when the same traffic signal display is continuously identified in multiple times by the traffic signal display identification processing.

11. The traffic signal display estimation system according to claim 1, further comprising an external sensor configured to detect a target object around the vehicle,
wherein the computer is further configured to:
execute a second traffic signal display estimation processing to determine a second estimated traffic signal display of the forward traffic signal based on a behavior of the target object detected by the external sensor;
execute a second evaluation value calculation processing to calculate a second evaluation value indicating a certainty of the second estimated traffic signal display of the forward traffic signal determined by the second traffic signal display estimation processing; and
execute an estimation result selection processing to select, as a final estimation result, the first estimated traffic signal display determined by the first traffic signal display estimation processing when the first evaluation value associated with the first estimated traffic signal display determined by the first traffic signal display estimation processing is greater than the second evaluation value calculated by the second evaluation value calculation processing, whereas to select, as the final estimation result, the second estimated traffic signal display determined by the second traffic signal display estimation processing when the first evaluation value associated with the first estimated traffic signal display determined by the first traffic signal display estimation processing is smaller than or equal to the second evaluation value calculated by the second evaluation value calculation processing.

* * * * *